(12) United States Patent
Webb et al.

(10) Patent No.: US 10,271,320 B2
(45) Date of Patent: Apr. 23, 2019

(54) TELECOMMUNICATIONS APPARATUS AND METHODS

(71) Applicant: SONY CORPORATION, Tokyo (JP)

(72) Inventors: Matthew William Webb, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 68 days.

(21) Appl. No.: 15/112,614

(22) PCT Filed: Dec. 11, 2014

(86) PCT No.: PCT/EP2014/077395
§ 371 (c)(1),
(2) Date: Jul. 19, 2016

(87) PCT Pub. No.: WO2015/113688
PCT Pub. Date: Aug. 6, 2015

(65) Prior Publication Data
US 2016/0345301 A1     Nov. 24, 2016

(30) Foreign Application Priority Data
Jan. 30, 2014 (EP) .................................. 14153283

(51) Int. Cl.
*H04W 72/04* (2009.01)
*H04W 68/02* (2009.01)
(Continued)

(52) U.S. Cl.
CPC ......... *H04W 72/042* (2013.01); *H04W 68/02* (2013.01); *H04W 72/0446* (2013.01); *H04W 74/0833* (2013.01); *H04W 88/02* (2013.01)

(58) Field of Classification Search
CPC ............... H04W 72/042; H04W 68/02; H04W 72/0446; H04W 74/0833; H04W 88/02
(Continued)

(56) References Cited

U.S. PATENT DOCUMENTS

2003/0035403 A1*   2/2003   Choi ..................... H04L 1/1887
                                                                                          370/342
2008/0207229 A1   8/2008   Cave et al.
(Continued)

FOREIGN PATENT DOCUMENTS

CN          101350701 A     1/2009
CN          102026375 A     4/2011
(Continued)

OTHER PUBLICATIONS

International Search Report dated Feb. 25, 2015, in PCT/EP2014/077395 Filed Dec. 11, 2014.
(Continued)

*Primary Examiner* — Obaidul Huq
(74) *Attorney, Agent, or Firm* — Xsensus, LLP

(57) ABSTRACT

A wireless telecommunication system that comprises a base station and a terminal device communicating over a radio interface. The radio interface supports a downlink control channel for conveying control messages from the base station to the terminal device and a downlink data channel (e.g. a physical downlink shared channel) for conveying higher-layer messages from the base station to the terminal device. The control messages convey information on resource allocations for the higher-layer messages on the downlink data channel. The terminal device is configured to receive a control message from the base station conveying an indication of allocated transmission resources on the downlink data channel and determine a validity period for the control-plane message. During the validity period for the (Continued)

control message the terminal device is configured to receive a plurality of different higher-layer messages from the base station on the downlink data channel using the allocated transmission resources.

13 Claims, 8 Drawing Sheets

(51) Int. Cl.
*H04W 74/08* (2009.01)
*H04W 88/02* (2009.01)

(58) Field of Classification Search
USPC .......................................... 370/310, 328, 329
See application file for complete search history.

(56) References Cited

U.S. PATENT DOCUMENTS

| | | | |
|---|---|---|---|
| 2009/0016254 A1* | 1/2009 | Lee ..................... | H04W 72/005 370/312 |
| 2013/0195066 A1 | 8/2013 | Lee et al. | |
| 2013/0230001 A1* | 9/2013 | Kimura ............. | H04W 72/0406 370/329 |
| 2014/0254538 A1* | 9/2014 | Park ..................... | H04L 1/0026 370/329 |

FOREIGN PATENT DOCUMENTS

| | | |
|---|---|---|
| GB | 2500896 A | 10/2013 |
| WO | 2013/066044 A1 | 5/2013 |

OTHER PUBLICATIONS

3GPP TS 22.368 V10.5.0, "3$^{rd}$ Generation Partnership Project; Technical Specification Group Services and System Aspects; Service requirements for Machine-Type Communications (MTC); Stage 1 (Release 10)," Jun. 2011 (16 Pages).

Holma, et al., "LTE for UMTS OFDMA and SC-FDMA Based Radio Access," John Wiley and Sons, 2009 (4 Pages).

3GPP TS 36.321 V11.3.0, "3$^{rd}$ Generation Partnership Project; Technical Specification Group Radio Access Network; Evolved Universal Terrestrial Radio Access (E-UTRA); Medium Access Control (MAC) protocol specification (Release 11)" Jun. 2013 (57 Pages).

3GPP TS 36.331 V11.4.0, "3$^{rd}$ Generation Partnership Project; Technical Specification Group Radio Access Network; Evolved Universal Terrestrial Radio Access (E-UTRA); Radio Resource Control (RRC); Protocol specification (Release 11)," Jun. 2013 (346 Pages).

3GPP TSG-RAN WG1 #75 R1-135422, "On the need of PDCCH for SIB and other Common Channels," MediaTek Inc., Nov. 2013 (6 Pages).

3GPP TSG-RAN WG1 #74 R1-134207, "Coverage enhancement techniques for PBCH," Alcatel-Lucent, Alcatel-Lucent Shanghai Bell, Oct. 2013 (5 Pages).

3GPP TSG-RAN WG1 #72 R1-130462, "Feasibility of coverage extension of physical channels for MTC devices," Alcatel-Lucent, Alcatel-Lucent Shanghai Bell , 2013 (7 Pages).

3GPP TSG-RAN WG1 #72 R1-130218, "On Required System Functionalities for MTC UEs Operating in Enhanced Coverage Mode," MediaTek Inc., 2013 (6 Pages).

3GPP TSG-RAN WG1 #71 R1-124888, "Required functionality for coverage enhancements for MTC," Ericsson, ST-Ericsson, Nov. 2012 (4 Pages).

Office Action and Search Report for Taiwanese Application No. 103142199, dated Nov. 28, 2018.

* cited by examiner

TELECOMMUNICATIONS APPARATUS AND METHODS

CROSS-REFERENCE TO RELATED APPLICATIONS

The present application claims priority to European Patent Application No. 14 153 283.8, filed in the European Patent Office on Jan. 30, 2014, the entire contents of which are hereby incorporated by reference herein in entirety.

BACKGROUND

Field

The present disclosure relates to telecommunications apparatus and methods. In particular, certain embodiments relate to schemes for communicating allocations of transmission resources of a shared channel in a wireless telecommunications system.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Mobile communication systems have evolved over the past ten years or so from the GSM System (Global System for Mobile communications) to the 3G system and now include packet data communications as well as circuit switched communications. The third generation partnership project (3GPP) is developing a fourth generation mobile communication system referred to as Long Term Evolution (LTE) in which a core network part has been evolved to form a more simplified architecture based on a merging of components of earlier mobile radio network architectures and a radio access interface which is based on Orthogonal Frequency Division Multiplexing (OFDM) on the downlink and Single Carrier Frequency Division Multiple Access (SC-FDMA) on the uplink.

Third and fourth generation mobile telecommunication systems, such as those based on the 3GPP defined UMTS and Long Term Evolution (LTE) architecture are becoming able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and there is a corresponding desire to extend the coverage available in such telecommunications systems (i.e. there is a desire to provide more reliable access to wireless telecommunications systems for terminal devices operating in coverage-limited locations).

A typical example of a coverage-limited terminal device might be a so-called machine type communication (MTC) device, such as a smart meter located in a customer's house and periodically transmitting information back to a central MTC server relating to the customer's consumption of a utility, such as gas, water, electricity and so on. Such a terminal device might operate in a coverage-limited location because, for example, it may be located in a basement or other location with relatively high penetration loss. Further information on characteristics of MTC-type devices can be found, for example, in the corresponding standards, such as ETSI TS 122 368 V10.530 (2011 July)/3GPP TS 22.368 version 10.5.0 Release 10) [1]. Some typical characteristics of MTC type terminal devices/MTC type data might include, for example, characteristics such as low mobility, high delay tolerance, small data transmissions, infrequent transmission and group-based features, policing and addressing.

In some situations a terminal device in a coverage-limited situation in a particular communication cell served by a base station might be unable to receive communications from the base station unless specific provision is made for it to do so. One way to increase coverage in this situation would be for the base station to increase the power of its transmissions. However, a blanket increase in transmission power from a base station could be expected to give rise to increased interference in neighbouring communication cells. An alternative approach would be for the base station to in effect focus/concentrate its available transmission power budget into a subset of transmission resources (e.g. in terms of frequency) which are selected from within the base station's overall transmission resources and allocated for transmissions to coverage-limited terminal devices. However, this approach can again lead to increased interference in neighbouring cells and may in some cases require increased coordination among base stations to optimise performance.

Another approach for providing coverage extension is to rely on repeated transmissions of signalling in multiple subframes. A terminal device may then combine the signalling received for a plurality of repeated transmissions to increase the likelihood of successfully decoding the signalling, e.g. using chase combining/maximal ratio combining techniques. This repeated transmission approach may be applied for control signalling (e.g. sent on a physical downlink control channel such as PDCCH in LTE) and/or other signalling (e.g. sent on a physical downlink shared channel such as PDSCH in LTE).

One draw-back of a repeated transmission approach for providing coverage extension is a corresponding increase in the amount of transmission resources needed to communicate with terminal devices, particularly in the amount of transmission resources needed to provide control messages to the terminal devices, and the inventors have recognised how this issue can be especially significant for certain types of communications, as discussed further below. There is therefore a need for schemes which can allow for communications with terminal devices to be made over a number of subframes with a reduction in the overall amount of transmission resources needed to support this as compared to conventional techniques.

SUMMARY

According to a first aspect of the present disclosure, there is provided a method of operating a terminal device communicating with a base station in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the method comprises receiving a control message from the base station conveying an indication of allocated transmission resources on the downlink data channel, determining a validity period for the control message, and receiving a plurality of other messages from the base station on the downlink data channel using the allocated transmission resources within the validity period for the control message.

According to a second aspect of the present disclosure, there is provided a terminal device for communicating with a base station in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the terminal device comprises a controller unit and a transceiver unit configured to operate together to receive a control message from the base station conveying an indication of allocated transmission resources on the downlink data channel, to determine a validity period for the control message, and to receive a plurality of other messages from the base station on the downlink data channel using the allocated transmission resources within the validity period for the control message.

According to a third aspect of the present disclosure, there is provided circuitry for a terminal device communicating with a base station in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the circuitry comprises a controller element and a transceiver element configured to operate together to cause the terminal device to receive a control message from the base station conveying an indication of allocated transmission resources on the downlink data channel, to determine a validity period for the control message, and to receive a plurality of other messages from the base station on the downlink data channel using the allocated transmission resources within the validity period for the control message According to a forth aspect of the present disclosure, there is provided a method of operating a base station communicating with a terminal device in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the method comprises transmitting a control message to the terminal device conveying an indication of allocated transmission resources on the downlink data channel, determining a validity period for the control message, and transmitting a plurality of other messages to the terminal device on the downlink data channel using the allocated transmission resources within the validity period for the control message.

According to a fifth aspect of the present disclosure, there is provided a base station for communicating with a terminal device in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the base station comprises a controller unit and a transceiver unit configured to operate together to transmit a control message to the terminal device conveying an indication of allocated transmission resources on the downlink data channel, to determine a validity period for the control message, and to transmit a plurality of other messages to the terminal device on the downlink data channel using the allocated transmission resources within the validity period for the control message.

According to a sixth aspect of the present disclosure, there is provided circuitry for a base station communicating with a terminal device in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the circuitry comprises a controller element and a transceiver element configured to operate together to cause the base station to transmit a control message to the terminal device conveying an indication of allocated transmission resources on the downlink data channel, to determine a validity period for the control message, and to transmit a plurality of other messages to the terminal device on the downlink data channel using the allocated transmission resources within the validity period for the control message.

According to a seventh aspect of the present disclosure, there is provided a method of operating a base station for communicating a message to one or more terminal devices in a wireless telecommunications system over a radio interface having a radio frame structure comprising a plurality of subframes, wherein the message may be transmitted in accordance with a first transmission scheme using transmission resources in a first number of radio subframes or transmitted in accordance with a second transmission scheme using transmission resources in a second number of radio subframes, wherein the second number is greater than the first number, wherein the message is associated with an identifier to indicate a terminal device to which the message is addressed, and wherein the method comprises selecting a characteristic for the identifier in dependence on whether the message is to be transmitted in accordance with the first transmission scheme or the second transmission scheme.

According to an eighth aspect of the present disclosure, there is provided a base station for communicating a message to one or more terminal devices in a wireless telecommunications system over a radio interface having a radio frame structure comprising a plurality of subframes, wherein the base station comprises a controller unit and a transceiver unit configured to operate together such that the message may be transmitted in accordance with a first transmission scheme using transmission resources in a first number of radio subframes or transmitted in accordance with a second transmission scheme using transmission resources in a second number of radio subframes, wherein the second number is greater than the first number, wherein the message is associated with an identifier to indicate a terminal device to which the message is addressed, and wherein a characteristic for the identifier is selected in dependence on whether the message is to be transmitted in accordance with the first transmission scheme or the second transmission scheme.

According to a ninth aspect of the present disclosure, there is provided circuitry for a base station communicating a message to one or more terminal devices in a wireless telecommunications system over a radio interface having a radio frame structure comprising a plurality of subframes, wherein the circuitry comprises a controller element and a transceiver element configured to operate together such that the message may be transmitted in accordance with a first transmission scheme using transmission resources in a first number of radio subframes or transmitted in accordance with a second transmission scheme using transmission resources in a second number of radio subframes, wherein the second number is greater than the first number, wherein the message is associated with an identifier to indicate a terminal device to which the message is addressed, and wherein a characteristic for the identifier is selected in dependence on whether the message is to be transmitted in accordance with the first transmission scheme or the second transmission scheme.

According to a 10th aspect of the present disclosure, there is provided a method of operating a terminal device for receiving a message from a base station in a wireless telecommunications system over a radio interface having a radio frame structure comprising a plurality of subframes, wherein the message may be transmitted by the base station in accordance with a first transmission scheme using transmission resources in a first number of radio subframes or transmitted by the base station in accordance with a second transmission scheme using transmission resources in a second number of radio subframes, wherein the second number is greater than the first number, and wherein the method comprises determining from an identifier associated with the message that the message is addressed to the terminal device, and further determining from a characteristic of the identifier whether the message transmission is in accordance with the first transmission scheme or the second transmission scheme.

According to an 11th aspect of the present disclosure, there is provided a terminal device for receiving a message from a base station in a wireless telecommunications system over a radio interface having a radio frame structure comprising a plurality of subframes, wherein the message may be transmitted by the base station in accordance with a first transmission scheme using transmission resources in a first number of radio subframes or transmitted by the base station in accordance with a second transmission scheme using transmission resources in a second number of radio subframes, wherein the second number is greater than the first number, and wherein the terminal device comprises a controller unit and a transceiver unit configured to operate together to determine from an identifier associated with the message that the message is addressed to the terminal device, and to further determine from a characteristic of the identifier whether the message transmission is in accordance with the first transmission scheme or the second transmission scheme.

According to a twelfth aspect of the present disclosure, there is provided circuitry for a terminal device for receiving a message from a base station in a wireless telecommunications system over a radio interface having a radio frame structure comprising a plurality of subframes, wherein the message may be transmitted by the base station in accordance with a first transmission scheme using transmission resources in a first number of radio subframes or transmitted by the base station in accordance with a second transmission scheme using transmission resources in a second number of radio subframes, wherein the second number is greater than the first number, and wherein the circuitry comprises a controller element and a transceiver element configured to operate together to determine from an identifier associated with the message that the message is addressed to the terminal device, and to further determine from a characteristic of the identifier whether the message transmission is in accordance with the first transmission scheme or the second transmission scheme.

Further respective aspects and features are defined by the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
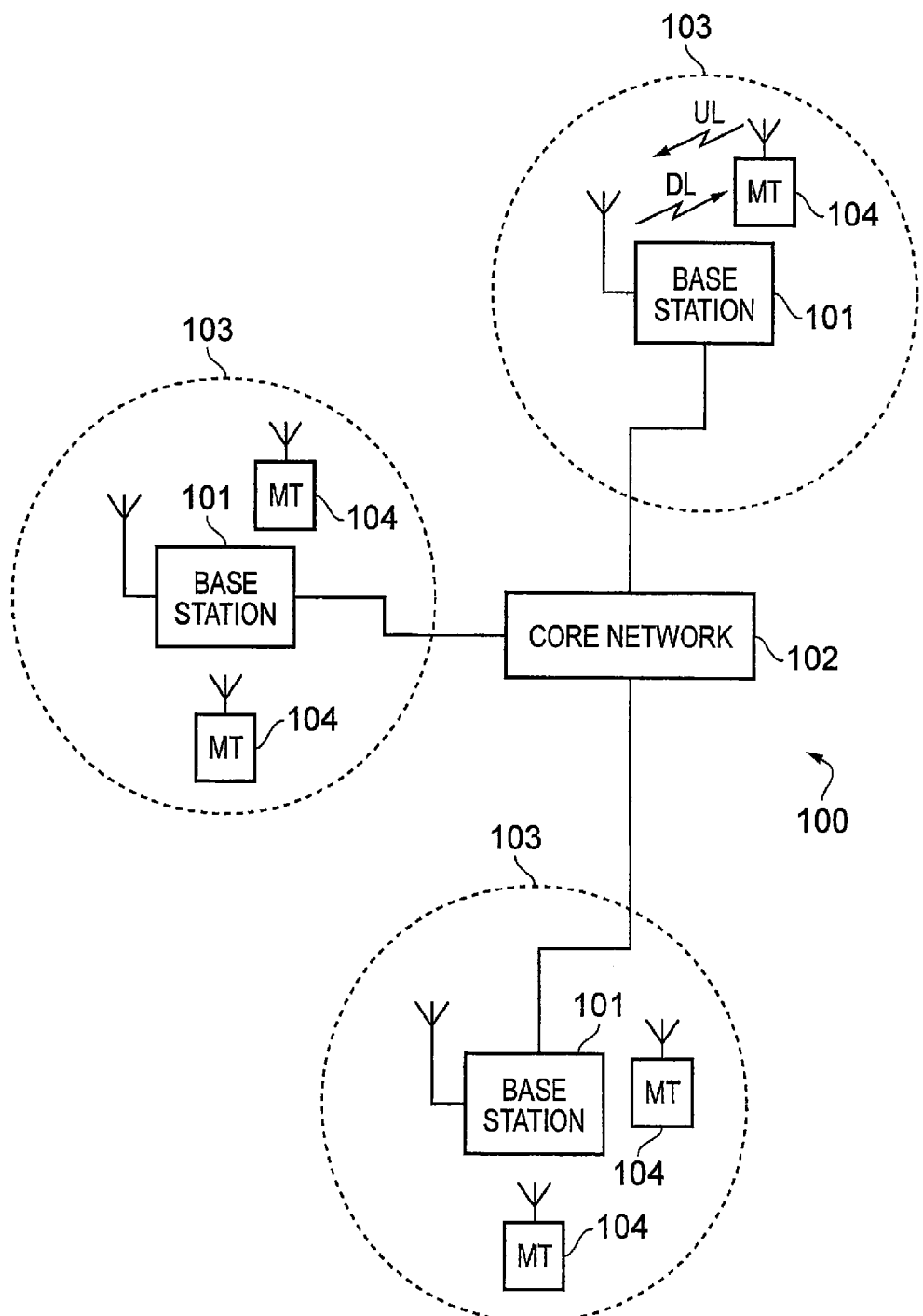
FIG. 1 provides a schematic diagram illustrating an example of a mobile telecommunication system.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, and so forth. Base stations may also be referred to as transceiver stations/nodeBs/e-nodeBs, and so forth.

Figure 2:
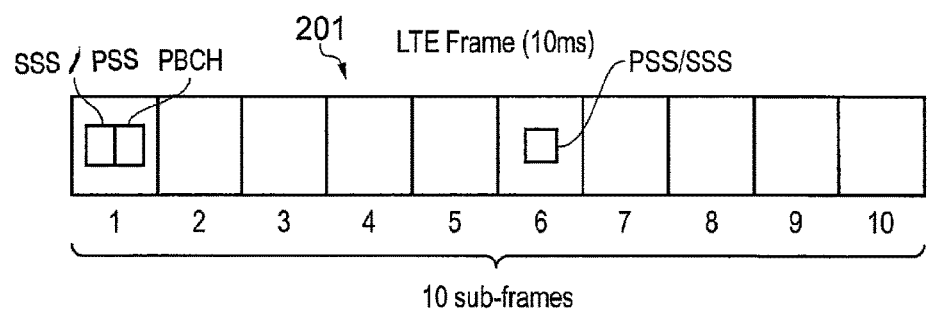
FIG. 2 provides a schematic diagram illustrating a LTE radio frame.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
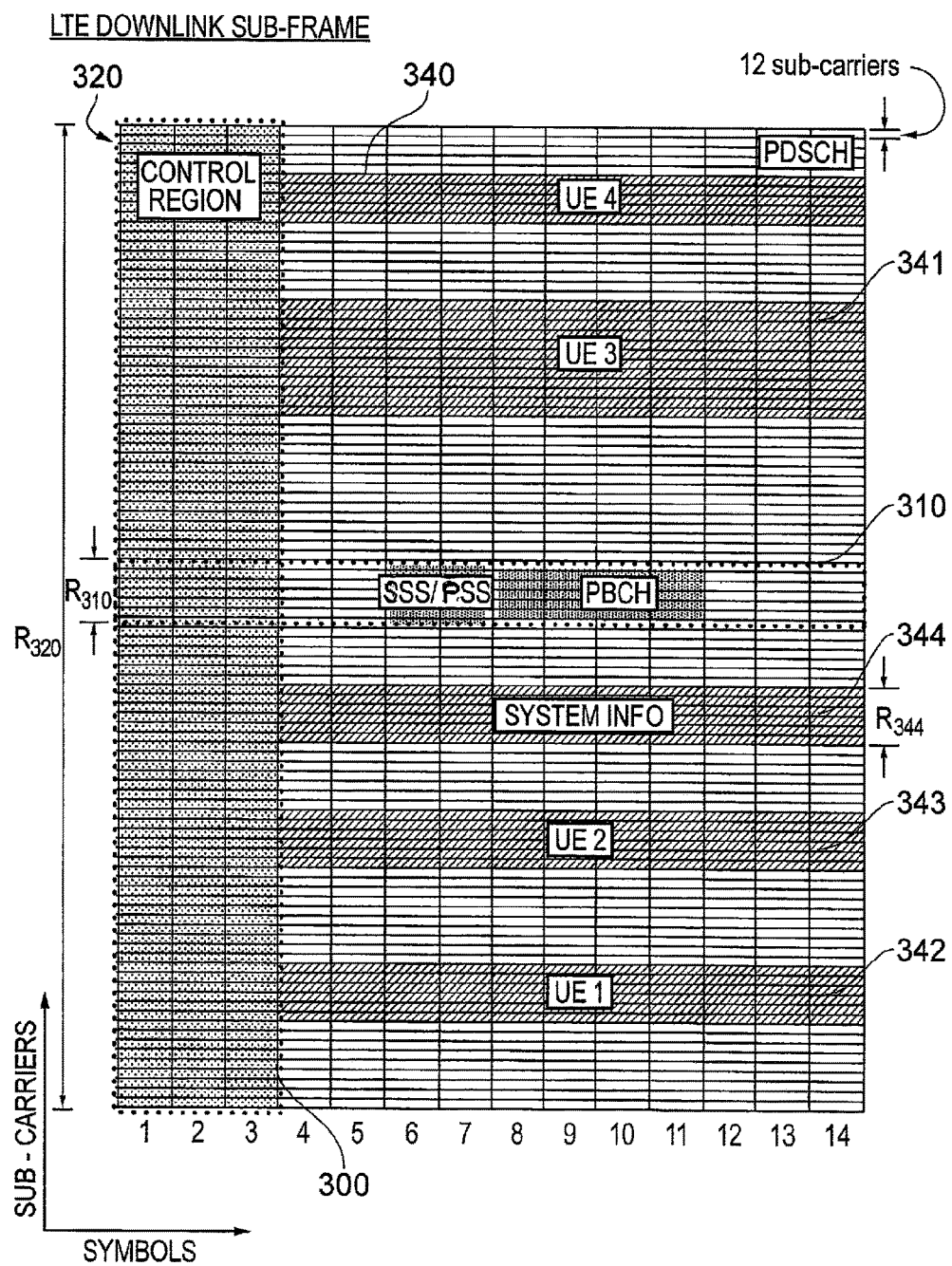
FIG. 3 provides a schematic diagram illustrating an example of a LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth and in this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are discussed further below but not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity. Therefore a conventional LTE terminal must be able to receive the entire channel bandwidth in order to receive and decode the control region.

Figure 4:
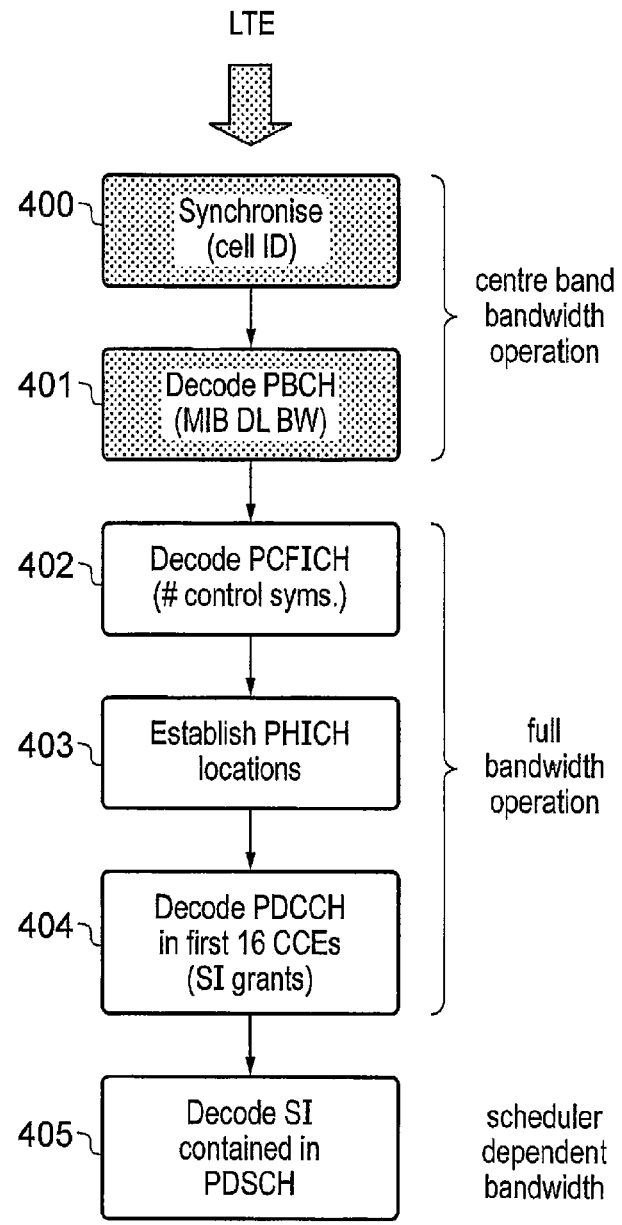
FIG. 4 provides a schematic diagram illustrating a LTE "camp-on" procedure.

FIG. 4 illustrates a LTE "camp-on" process, that is, the process followed by a terminal so that it can decode downlink transmissions which are sent by a base station via a downlink channel. Using this process, the terminal can identify the parts of the transmissions that include system information for the cell and thus decode configuration information for the cell.

As can be seen in FIG. 4, in a conventional LTE camp-on procedure, the terminal first synchronizes with the base station (step 400) using the PSS and SSS in the centre band and then decodes the PBCH (step 401). Once the terminal has performed steps 400 and 401, it is synchronized with the base station.

For each subframe, the terminal then decodes the PCFICH which is distributed across the entire bandwidth of carrier 320 (step 402). As discussed above, a LTE downlink carrier can be up to 20 MHz wide (1200 subcarriers) and a standard LTE-compliant terminal therefore has to have the capability to receive and decode transmissions on a 20 MHz bandwidth in order to decode the PCFICH. Accordingly, at the PCFICH decoding stage, with a 20 MHz carrier band, the terminal operates at a larger bandwidth (bandwidth of R320) than during steps 400 and 401 (bandwidth of R310) relating to synchronization and PBCH decoding.

The terminal then ascertains the PHICH locations (step 403) and decodes the PDCCH (step 404), in particular for identifying system information transmissions and for identifying its dedicated allocation grants. The allocation grants are used by the terminal to locate system information and to locate its data in the PDSCH. Both system information and dedicated allocations are transmitted on PDSCH and scheduled within the carrier band 320. Steps 403 and 404 also require a standard LTE-compliant terminal to operate on the entire bandwidth R320 of the carrier band. Allocation grants may also or alternatively be decoded from EPDCCH.

At steps 402 to 404, the terminal decodes information contained in the control region 300 of a subframe. As explained above, in LTE, the three control channels mentioned above (PCFICH, PHICH and PDCCH) can be found across the control region 300 of the carrier where the control region extends over the range R320 and occupies the first one, two or three OFDM symbols of each subframe as discussed above. In a subframe, typically the control channels do not use all the resource elements within the control region 300, but they are scattered across the entire region, such that a LTE terminal has to be able to simultaneously receive the entire control region 300 for decoding each of the three control channels.

The terminal can then decode the PDSCH (step 405) which contains system information or data transmitted for this terminal.

As explained above, in a LTE subframe the PDSCH generally occupies groups of resource elements which follow the control region. The data in the blocks of resource elements 340, 341, 342, 343 allocated to the different mobile communication terminals (UEs) and the system information data in the block of resources 344 shown in FIG. 3 have a smaller bandwidth than the bandwidth of the entire carrier. To decode these blocks a terminal first receives the PDCCH spread across the frequency range R320 and/or the EPDCCH to determine if the (E)PDCCH indicates there are PDSCH resources in the subframe that need to be decoded by the UE. The intended recipient(s) for (E)PDCCH signalling in LTE is established through the use of radio network temporary identifiers (RNTI). (E)PDCCH signalling is addressed to a particular RNTI by using the RNTI to scramble cyclic redundancy check (CRC) bits associated with the (E)PDCCH signalling. Each connected UE in a cell is associated with a Cell RNTI (C-RNTI) that may be used to address PDCCH signalling to that particular UE. In addition there are other RNTIs defined and these may be used to simultaneously address groups of terminal devices. For example, a System Information RNTI (SI-RNTI) is defined and PDSCH transmissions comprising SI are allocated by (E)PDCCH signalling addressed to SI-RNTI. Various other RNTIs are defined for various other types of signalling. Some examples include a random-access RNTI (RA-RNTI), a Paging RNTI (P-RNTI), a Transmit Power Control Physical Uplink Control Channel RNTI (TPC-PUCCH-RNTI) and a Transmit Power Control Physical Uplink Shared Channel-RNTI (TPC-PUSCH-RNTI).

Thus, once a UE has received a downlink subframe, the UE searches for (E)PDCCH signalling associated with any RNTI that apply for the UE in the subframe to identify any corresponding allocations of transmission resources on PDSCH. If there is an allocation message addressed to the UE on (E)PDCCH the UE will proceed to decode the PDSCH in the relevant frequency range (if any) indicated by the PDCCH. So for example, UE 1 discussed above decodes the whole control region 300 to determine its resource allocation and then extracts the relevant data from the corresponding resource block 342.

Figure 5:
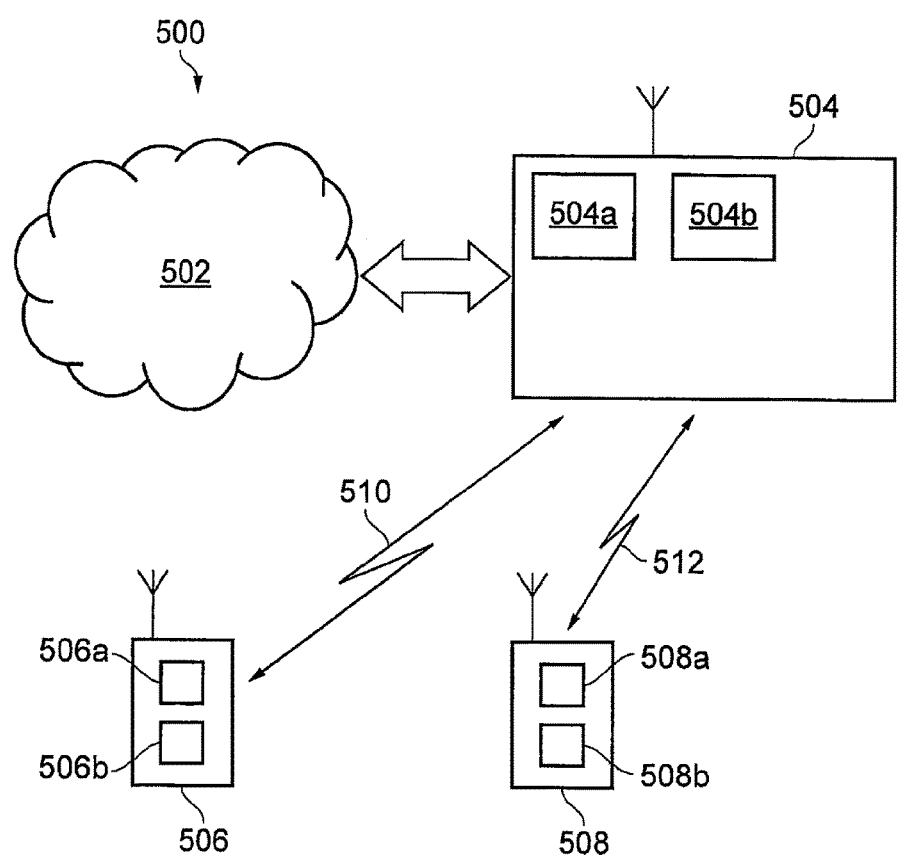
FIG. 5 schematically represents a wireless telecommunications system according to an embodiment of the disclosure.

FIG. 5 schematically shows a telecommunications system 500 according to an embodiment of the disclosure. The telecommunications system 500 in this example is based broadly on a LTE-type architecture. As such many aspects of the operation of the telecommunications system 500 are standard and well understood and not described here in detail in the interest of brevity. Operational aspects of the telecommunications system 500 which are not specifically described herein may be implemented in accordance with any known techniques, for example according to the established LTE-standards and known variations thereof.

The telecommunications system 500 comprises a core network part (evolved packet core) 502 coupled to a radio network part. The radio network part comprises a base station (evolved-nodeB) 504, a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 5 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 5 may be broadly conventional apart from where modified to provide functionality in accordance with embodiments of the disclosure as discussed herein.

In this example, it is assumed the first terminal device 506 is a conventional smart-phone type terminal device communicating with the base station 504. Thus, and as is conventional, this first terminal device 506 comprises a transceiver unit 506a for transmission and reception of wireless signals and a controller unit 506b configured to control the smart phone 506. The controller unit 506b may comprise a processor unit which is suitably configured/programmed to provide the desired functionality using conventional programming/configuration techniques for equipment in wireless telecommunications systems. The transceiver unit 506a and the controller unit 506b are schematically shown in FIG. 5 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device according to an embodiment of the disclosure and located in an area of restricted coverage. As discussed above, MTC devices may be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 5 is such a device. It will, however, the appreciated that embodiments of the disclosure may also be implemented for other types of terminal device.

As with the smart phone 506, the MTC device 508 comprises a transceiver unit 508a for transmission and reception of wireless signals and a controller unit 508b configured to control the MTC device 508. The controller unit 508b may comprise a processor unit which is suitably configured/programmed to provide the desired functionality described herein using conventional programming/configuration techniques for equipment in wireless telecommunications systems. The transceiver unit 508a and the controller unit 508b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/ circuitry, or using a plurality of discrete circuitry/processing elements for providing different elements of the desired functionality. It will be appreciated the MTC device 508 will in general comprise various other elements associated with its operating functionality in accordance with established wireless telecommunications techniques (e.g. a power source, possibly a user interface, and so forth).

The base station 504 comprises a transceiver unit 504a for transmission and reception of wireless signals and a controller unit 504b configured to control the base station 504. The controller unit 504b may comprise a processor unit which is suitably configured/programmed to provide the desired functionality described herein using conventional programming/configuration techniques for equipment in wireless telecommunications systems. The transceiver unit 504a and the controller unit 504b are schematically shown in FIG. 5 as separate elements for ease of representation. However, it will be appreciated that the functionality of these units can be provided in various different ways, for example using a single suitably programmed general purpose computer, or suitably configured application-specific integrated circuit(s)/circuitry or using a plurality of discrete circuitry/processing elements for providing different elements of the desired functionality. It will be appreciated the base station 504 will in general comprise various other elements associated with its operating functionality. For example, the base station 504 will in general comprise a scheduling entity responsible for scheduling communications. The functionality of the scheduling entity may, for example, be subsumed by the controller unit 504b.

Thus, the base station 504 is configured to communicate data with the smart phone 506 over a first radio communication link 510 and communicate data with the MTC device 508 over a second radio communication link 512. Both radio links may be supported within a single radio frame structure associated with the base station 504. It is assumed here the base station 504 is configured to communicate with the smart phone 506 over the first radio communication link 510 in accordance with the established principles of LTE-based communications and to communicate with the MTC-device 506 over the second radio communication link 512 in accordance with embodiments of the disclosure as described herein. It will be appreciated the base station may readily obtain information indicating the different classes of terminal device which are attached to the base station in accordance with conventional techniques. That is to say, the base station will be aware that the smart phone is of a device class that includes conventional smartphones and the MTC device is of a device class that includes MTC devices. Furthermore, the base station may establish using conventional techniques that the MTC device 508 is a device operating in a coverage limited situation such that steps are needed to increase the likelihood of the MTC device being able to decode downlink transmissions.

As noted above, in a LTE-based wireless telecommunications system some of the fundamental information required for a terminal device to operate in a cell is transmitted on PBCH in the Master Information Block (MIB). Other information regarding the system configuration is divided among System Information Blocks (SIBs) referred to as SIB1, SIB2, SIB3, . . . etc. (there are 16 SIBs defined as of Release 11 LTE). The SIBs are transmitted in system information (SI) messages, which, apart from SIB1, may contain multiple SIBs (termed first SI, second SI, etc.). There may be one or several SI messages transmitted at different periodicities. Each SI message may convey multiple SIBs suitable for scheduling with the same periodicity. The timings for SIB1 message transmissions are fixed on an 80 ms period and they occur in the fifth subframe of radio frames when System Frame Number (SFN) is a multiple of 8 (i.e. SFN mod 8=0). There are retransmissions of SIB1 messages provided in every other radio frame within the 80 ms period. The timings for other SIB transmission messages are configured in SIB1. The transmission resource allocations for the SI messages on PDSCH within a subframe are provided to terminal devices using PDCCH allocation messages addressed to SI-RNTI (System Information Radio Network Temporary Identifier—currently 0xFFFF in LTE). At higher layers, SI is carried on the logical broadcast control channel (BCCH).

In LTE the SI messages are transmitted within periodically occurring time domain windows (referred to as SI-windows) using dynamic scheduling. Each SI message is associated with a SI-window and the SI-windows of different SI messages do not overlap. That is, within one SI-window only the corresponding SI message is transmitted. The length of the SI-window is common for all SI messages, and is configurable. Within the SI-window, the corresponding SI message can be transmitted a number of times in any subframe other than MBSFN (multicast-broadcast single frequency network) subframes, uplink subframes in TDD (time division duplex), and subframe #5 of radio frames for which SFN (system frame number) mod 2=0. Terminal devices acquire the detailed time-domain scheduling (and other information, e.g. frequency-domain scheduling, transport format) from decoding SI-RNTI on PDCCH. A single SI-RNTI is used to address SystemInformationBlockType1 as well as all SI messages. SystemInformationBlockType1 configures the SI-window length and the transmission periodicity for the SI messages.

The system information in a cell may be changed, although typically this happens rarely with system information perhaps remaining unchanged for hours, days, or even weeks.

For changes of system information other than those related to EAB (Extended Access Barring), ETWS (Earthquake Tsunami Warning System) and CMAS (Commercial Mobile Alert System), there is a BCCH modification period defined (which may be referred to as a "SI modification period"). SI modification period boundaries are defined on radio frames for which SFN mod q=0, for a cell-specific value of q.

When there is a change in system information, the new system information is transmitted from the start of a new SI modification period.

The general process for implementing a change in system information in a LTE-based network is described, for example, in Section 5.2.1.3 of ETSI TS 136 331 V11.4.0 (2013 July)/3GPP TS 36.331 version 11.4.0 Release 11 [3]. In summary, a base station indicates a change of system information as follows.

1. When the network changes system information it notifies terminal devices about the change by transmitting a PDCCH resource allocation message addressed to the paging RNTI (P-RNTI). This directs the terminal devices to decode PDSCH resources containing a Paging message with a SystemInfoModification flag set to true. This may be done, for example, throughout one SI modification period. Both RRC_IDLE and RRC_CONNECTED terminal devices check for paging messages periodically. It may be noted that EAB alterations, ETWS and CMAS notifications may be separately modified with separate flags in a paging message (but can also be modified along with other SIBs).

2. In a following SI modification period, the network transmits the modified system information, and may increment a SystemInfoValueTag in SIB1. This value tag can indicate changes in any SIB, but it might not be used for EAB, ETWS, CMAS and some regularly changing SI parameters such as CDMA2000 system time. Terminal devices can use SystemInfoValueTag to verify if currently stored system information is still valid, for example on return from being out of coverage when the UE may have missed a system information change notification in paging.

More details on system information and changes in system information in a LTE-based system can be found in ETSI TS 136 331 V11.4.0 (2013 July)/3GPP TS 36.331 version 11.4.0 Release 11 [3].

As discussed above, it has been proposed to improve coverage for terminal devices in a wireless telecommunications system by introducing repetitions of a transmission which a terminal device may combine to provide an increased likelihood of successful decoding.

Figure 6:
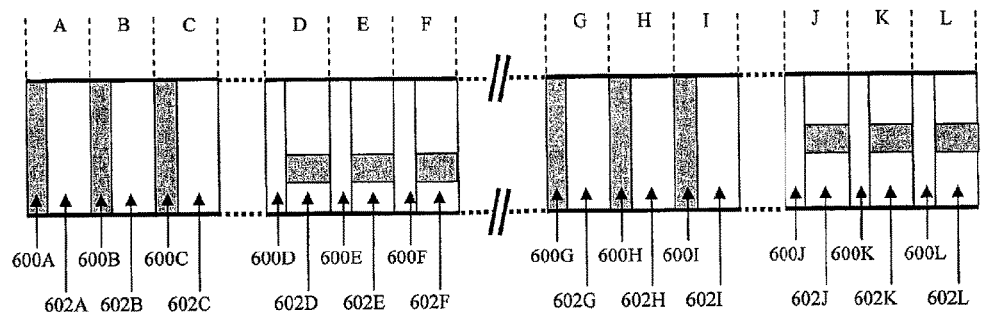
FIG. 6 schematically represents a series of downlink subframes for communicating with a terminal device operating in the wireless telecommunications system of FIG. 5.

FIG. 6 schematically represents an approach for providing coverage extension through repeated transmissions for an SI message in accordance with existing techniques. FIG. 6 schematically shows a sequence of LTE downlink subframes (labelled as subframes "A", "B", "C", . . . , "L" to aid explanation) with shading to schematically indicate which regions in which subframes are used to convey system information. The subframes represented in FIG. 6 comprise four groups of three contiguous subframes with spaces between the groups as schematically indicated by dotted lines and discussed further below. Although not shown in FIG. 6, the gaps between the groups comprise a continuing sequence of subframes used for other communications that are not relevant to the system information messaging considered here. As discussed above, each subframe comprises a control region 600 and a PDSCH region 602. The control regions 600 for the respective subframes are labelled in FIG. 6 with the identification letter for the relevant subframe, i.e. as 600A, 600B, 600C, etc. The PDSCH regions for the respective subframes are similarly labelled in FIG. 6 as 602A, 602B, 602C, etc. Each subframe represented in FIG. 6 is in essence a simplified version of what is represented in FIG. 3. Thus, the control regions 600 support the PCFICH, PHICH and PDCCH channels as discussed above while the PDSCH regions 602 support user-plane data and system information (among other things) and the EPDCCD if implemented. The most significant aspect of the control region 600 in the context of embodiments of the present disclosure relate to the PDCCH and so for simplicity the control regions 600 may sometimes be referred to herein as PDCCH regions 600.

Before explaining the repeated transmissions approach to providing coverage extension represented in FIG. 6 it is considered helpful to clarify some aspects of the terminology to be used herein. The term "repeat transmission" (and related terms) will be used to refer to a transmission in an individual subframe which is part of a sequence of transmissions that are being repeated for the purposes of providing coverage extension for a message being conveyed between a base station and a terminal device (such as a PDCCH message or a PDSCH message). Thus in a coverage extension context, the transmission of a (E)PDCCH message comprises a plurality of "repeat transmissions" on (E)PD-CCH and the transmission of a PDSCH message comprises a plurality of "repeat transmissions" on PDSCH. The term "re-transmission" (and related terms) will be used to refer to the transmission of a message that has already been sent at least once before. These terms should be interpreted accordingly unless the context demands otherwise.

For the example repeat transmission approach to coverage extension represented in FIG. 6 it is assumed for ease of representation the approach relies on providing only three repeat transmissions for each PDCCH message and each PDSCH message. It will, however, be appreciated that in practice larger numbers of repeat transmissions will typically be involved, for example there may be tens or hundreds of repeats comprising each message to provide a correspondingly higher degree of coverage extension. Furthermore, it will be appreciated that PDCCH messages and PDSCH messages may comprise different numbers of repeat transmissions (for example because different coding schemes are adopted meaning that different numbers of repeat transmissions are needed for a given probability of successful reception).

Thus, referring to FIG. 6, subframes A, B and C are used to signal a PDCCH message addressed to SI-RNTI by sending three repeat PDCCH transmissions in the respective PDCCH regions 600A, 600B, 600C. Each PDCCH repeat transmission addressed to SI-RNTI in the PDCCH regions 600A, 600B, 600C in effect comprises a duplication of the same downlink control information which a terminal device can combine to seek to establish the content of the PDCCH message. For this example repeat-transmission based coverage extension scheme it is assumed a particular type of message subject to repeat transmissions is addressed to the same RNTI (e.g. SI-RNTI for a system information related type of messages) as if the same type of message were subject to conventional single-subframe transmission. However, as discussed further below, in accordance with certain embodiments of the disclosure identifiers having different characteristics (e.g. values) may be used for a given type of message depending on whether the messages to be sent in accordance with a first transmission scheme (e.g. using a conventional single subframe based transmission approach) or a second transmission scheme (e.g. using a repeat-transmission scheme for coverage extension). Furthermore, it will be appreciated the approach of using identifiers associated with a particular type of message having different characteristics according to what transmission scheme is to be used to transmit the message can be used in accordance with embodiments of the disclosure with or without the use of validity periods as disclosed herein.

The PDCCH message comprising the three repeat transmissions in the PDCCH regions of subframes A, B and C indicates resource blocks to be used for a subsequent PDSCH message comprising the transmission of system information. This PDSCH message itself comprises a plurality of repeat transmissions, and, in this example, are represented by shading in the PDSCH regions 602D, 602E and 602F of subframes D, E and F. The transmission resources, for example in terms of specific resource elements, used to convey the repeat transmissions of the system information message in the PDSCH regions 602D, 602E and 602F are indicated in the corresponding PDCCH message addressed to SI-RNTI and comprising the repeat transmissions in PDCCH regions 600A, 600B, 600C in accordance with conventional resource allocation techniques in the context of coverage extension using repeat transmissions. Whilst the shading in FIG. 6 schematically represents the same frequency resources being used for each repeat transmission in the respective PDSCH regions 602D, 602E and 602F of the subframes D, E, F, in principle the repeat-transmission approach may be configured to include frequency hopping for the different repeat transmissions comprising the PDSCH message sent in subframes D, E, F. The nature of any such frequency hopping may be pre-defined, for example it may be pre-specified according to an operating standard for the wireless telecommunications system, or it may be established in previous RRC (radio resource control) signalling, or it may be indicated in the PDCCH message.

As schematically represented in FIG. 6 there is a gap between subframes C and D. This follows the currently-proposed approaches for repeat-transmission coverage extension whereby the transmission of a PDSCH message comprising a plurality of repeat transmissions does not start until after all repeat transmissions of the corresponding PDCCH message have been sent. This is to help reduce the buffering requirements at the terminal device. Furthermore, current proposals indicate there should be no overlap between the end of the repeat transmissions comprising the PDCCH message and the start of the repeat transmissions comprising the PDSCH message. It will, however, be appreciated the specific implementation of such aspects of a repeat transmission approach for providing coverage extension are not significant to the principles underlying the present disclosure. That is to say, the principles described herein may equally be implemented in association with other repeat transmission approaches (e.g. with repeat transmissions of PDCCH and its corresponding PDSCH occurring in the same subframe).

In subframes following the transmission of the system information message as schematically indicated in subframes D, E and F in FIG. 6, the wireless telecommunications system continues to operate in accordance with its normal operating techniques until subframe G represented. Subframe G represents the beginning of another system information message. As noted above, system information messages can be regularly retransmitted in accordance with LTE techniques, and in this regard the system information message beginning at subframe G is considered in this example to be a re-transmission of the system information message transmitted using subframes A to F as discussed above. The specific timing of the re-transmission of system information (i.e. the timing of subframe G relative to subframe A) may follow any conventional system information re-transmission schedule. The principles underlying the re-transmission of the system information message starting from subframe G follow those described above. Thus, a PDCCH message addressed to SI-RNTI is sent using the PDCCH regions 600G, 600H and 600I of subframes G, H and I to allocate resources for a PDSCH message comprising three repeat transmissions in the PDSCH regions 602J, 602K and 602L in subframes J, K and L as indicated by shading in FIG. 6. It may be noted in this example the frequencies of the resource elements for the re-transmission of the system information message on PDSCH in subframes J, K, L is different from that used in subframes D, E, F for the previous transmission, but this is not of any particular significance. Furthermore, the transmissions of the PDSCH message in subframes D, E, F, J, K, L may comprise different so-called redundancy versions of the PDSCH message comprising different combinations of information bits and redundancy bits arising from a forward error correction coding process.

It will be appreciated the transmission resources represented in FIG. 6 which are not involved in the SI message signalling discussed above can be used for other communications in the network in the usual manner. In particular, it will be appreciated that although the entirety of the PDCCH regions associated with repeat transmissions of the PDCCH for the system information messages are shown shaded in FIG. 6, this is merely to highlight those subframes in which a PDCCH for the system information messages is transmitted compared to those where it is not, and in practice these regions will comprise multiple PDCCH messages addressing different terminal devices for allocating resources for various different types of communication on PDSCH.

System information signalling in LTE is sent on what is approaching a more or less continuous basis. This means there is a considerable amount of PDSCH traffic for broadcasting system information messages comprising the SIBs. There is a corresponding requirement for PDCCH signalling to schedule the PDSCH resources for system information messages. The inventors have recognised that this can become a significant issue in a coverage extension scenario where a number of repetitions are expected, as illustrated in FIG. 6. This is because for each PDSCH message comprising a plurality of PDSCH repeat transmissions (i.e. the PDSCH message sent using resources in subframes D, E and F and the PDSCH message sent using resources in subframes J, K and L) there is a corresponding SI-RNTI PDCCH message comprising a plurality of PDCCH repeat transmissions (i.e. the PDCCH message sent using resources in subframes A, B and C and the PDCCH message sent using resources in subframes G, H and I). With the potential for perhaps a hundred or more repeat transmissions to provide coverage extension to the edge of a base station's corresponding cell for system information messages a large fraction of the available control region resources will be needed to support this function following the approach of FIG. 6. There is of course a corresponding increase in the use of PDSCH resources with the approach represented in FIG. 6, but it is to be expected that in many situations it will be PDCCH resources that are more at a premium owing to the limited resources available in the control channel region for PDCCH and the priority typically given to PDSCH over EPDCCH in the PDSCH region. This is especially likely in networks supporting large numbers of MTC devices since these are likely to have a higher ratio of control signalling to data signalling as compared to the traffic profiles typically associated with conventional terminal devices. The increased PDCCH and/or EPDCCH resources needed to support repeat transmissions of system information messages could ultimately make it difficult to schedule unicast PDSCH transmissions to terminal devices operating within the system because of a lack an availability of control region resources to indicate the allocation of PDSCH resources and/or a lack of PDSCH region resource to indicate the allocation of PDSCH resources.

To address this type of issue there have been proposals to stop using PDCCH and EPDCCH messages resource allocations for PDSCH messages comprising system information (i.e. for system information messages). One proposal (described in the 3GPP document R1-135422, "On the need of PDCCH for SIB and other Common Channel", Mediatek, RAN1#75, San Francisco, November 2013 [4]) is to avoid providing any scheduling information in respect of system information-carrying PDSCH transmissions. Instead, a terminal device will be expected to perform blind searching of the PDSCH region to identify if there are any relevant system information transmissions. A drawback with this approach is a significant increase in the processing load required for terminal devices. To reduce the processing load required at the terminal device to a more manageable level the system information messages could be confined to a restricted subset of transmission resources comprising the PDSCH region. However, this approach still requires additional processing tasks to be performed by the terminal device and introduces reduced scheduling flexibility. Another proposal (described in the 3GPP document R1-134207, "Coverage enhancement techniques for PBCH", Alcatel-Lucent, Alcatel-Lucent Shanghai Bell, RAN1#74bis, Guangzhou, October 2013 [5]) is to avoid using PDCCH messages to provide scheduling information in respect of system information-carrying PDSCH messages. Instead it is proposed that some of the spare bits currently available in the Master Information Block (MIB) in LTE are used for providing scheduling indications for system information messages. However, there are a limited number of spare bits available for this and so the approach does not allow for any significant degree of flexibility in scheduling system information messages, and furthermore the approach further reduces the number of spare bits available for other uses.

In view of these issues, the inventors have developed an alternative approach for reducing the amount of control signalling required to support resource allocations for higher-layer transmissions in a wireless telecommunications system. In particular, but not exclusively, the inventors have developed an approach which may be applied for reducing the amount of control-channel signalling required to support resource allocations for downlink messages, such as system information messages, and in particular for messages which may be subject to re-transmissions on a defined schedule and which may, in some cases, be sent using a repeat transmission approach to provide a degree of coverage extension.

Figure 7:
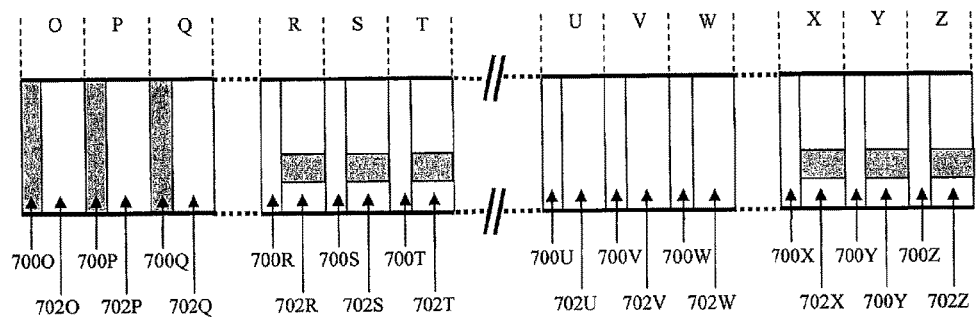
FIG. 7 schematically represents a series of downlink subframes for communicating with a terminal device operating in the wireless telecommunications system of FIG. 5 in accordance with an embodiment of the disclosure.
Figure 8:
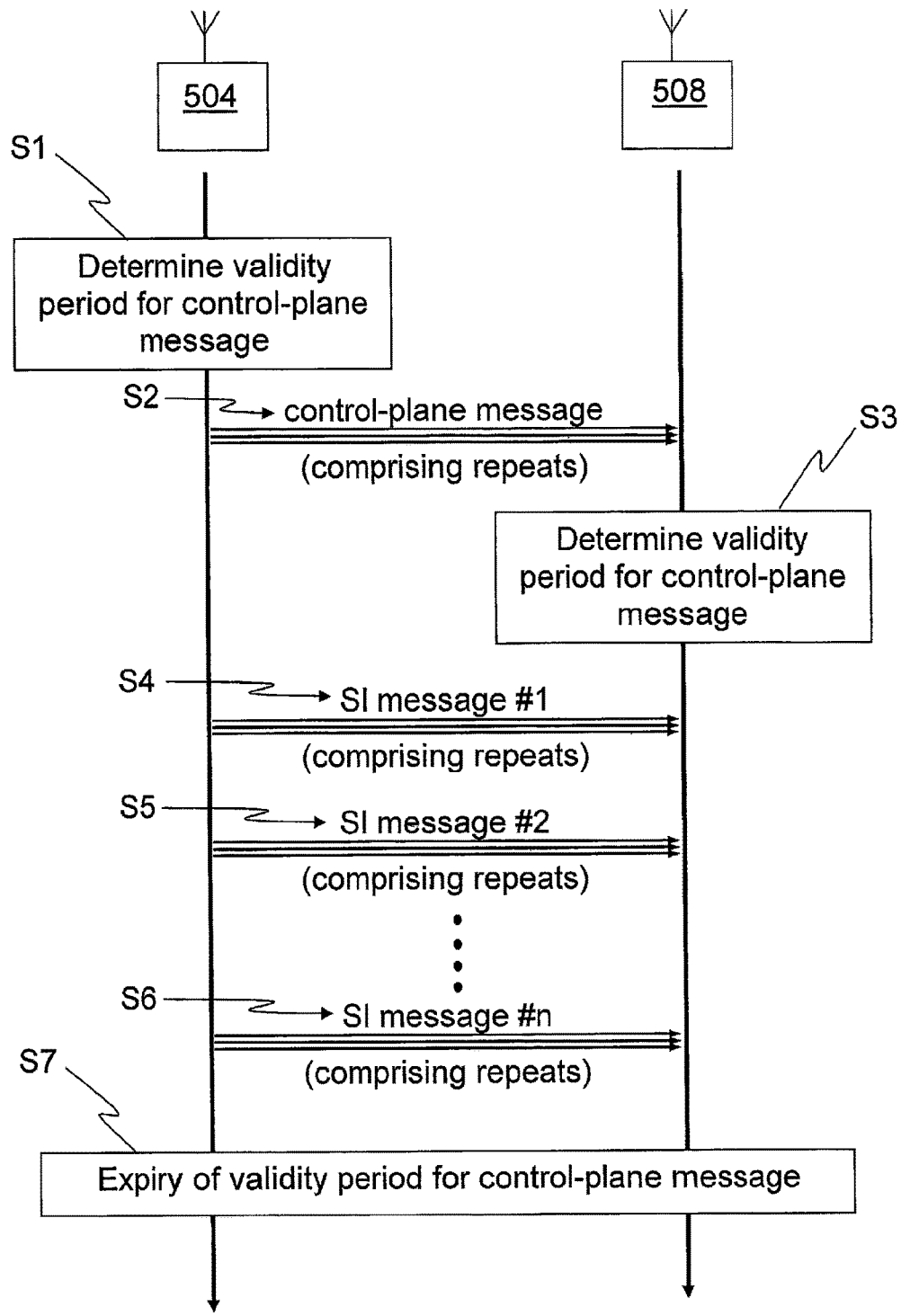
FIG. 8 is a signalling ladder diagram representing communications between a base station and a terminal device operating in accordance with an embodiment of the disclosure.

FIG. 7 is similar to, and represents various aspects that will be understood from, FIG. 6, but shows an approach in accordance with certain embodiments of the present disclosure. FIG. 8 is a signalling ladder diagram schematically representing modes of operation for the terminal device 508 and the base station 504 schematically represented in FIG. 5 in accordance with some embodiments of the present disclosure for implementing an approach of the kind represented in FIG. 7. In broad summary, some embodiments of the disclosure introduce the concept of a validity period for a PDCCH message to thereby indicate transmission resources that may be used for a plurality of PDSCH messages within the validity period. That is to say the control message transmitted on the PDCCH is considered valid for a period that is longer than the period needed to transmit a single PDSCH message (whether in one subframe or with repeat transmissions in a plurality of subframes to provide coverage extension). This means multiple PDSCH messages can in effect be scheduled using the control-region resources of only a single PDCCH message. There are various different ways in which the validity period may be established/determined, as discussed further below.

For the example represented in FIG. 7, and as with FIG. 6, it is assumed system information is being transmitted from a base station to a terminal device with a repeat transmission approach to providing coverage extension. Again the example approach to coverage extension represented in FIG. 7 is assumed for ease of representation to rely on providing only three repeat transmissions for each PDCCH and PDSCH message. However, as noted above, it will be appreciated that in practice larger numbers of repeat transmissions will typically be involved, for example there may be tens or hundreds of repeats comprising each message to provide a correspondingly higher degree of coverage extension. Furthermore, it will be appreciated that PDCCH messages and PDSCH messages need not necessarily comprise the same number of repeat transmissions (for example different coding schemes may be adopted meaning that different numbers of repeat transmissions are appropriate to provide a desired probability of successful reception for each message).

Thus FIG. 7 schematically represents an approach for providing coverage extension through repeated transmissions for a plurality of SI messages with reduced control signalling overhead in accordance with an embodiment of the disclosure. FIG. 7 schematically shows a sequence of LTE downlink subframes (labelled as subframes "O", "P", "Q", . . . , "Z" to aid explanation) with shading to schematically indicate which regions in which subframes are used to convey messages associated with the system information. The subframes represented in FIG. 7 comprise four groups of three contiguous subframes with spaces between the groups as schematically indicated by dotted lines. Although not shown in FIG. 7, the gaps between the groups comprise a continuing sequence of subframes used for other communications that are not relevant to the system information messaging considered here. As discussed above, each subframe comprises a control region 700 and a PDSCH region 702. The control regions 700 for the respective subframes are labelled in FIG. 7 with the identification letter for the relevant subframe, i.e. as 700O, 700P, 700Q, etc. The PDSCH regions for the respective subframes are similarly labelled in FIG. 6 as 702O, 702P, 702Q, etc.

As already noted above, aspects of the operation of a wireless telecommunications system in accordance with embodiments of the disclosure, for example as shown in FIGS. 7 and 8, which are not specifically described herein may be implemented in accordance with any conventional techniques. In this regard, insofar as the operation of embodiments of the disclosure follow conventional techniques the respective subframes represented in FIG. 7 may be similar to that is represented in FIG. 3. Thus, the control regions 700 support PCFICH, PHICH and PDCCH channels as discussed above while the PDSCH regions 702 support user-plane data and system information (among other things) and EPDCCH if implemented. The most significant aspect of the control region 700 in the context of embodiments of the present disclosure relate to the PDCCH and so for simplicity the control regions 700 may sometimes be referred to herein as PDCCH regions 700.

Thus referring to FIG. 7 subframes O, P and Q are used to signal a PDCCH message addressed to SI-RNTI by sending three repeat PDCCH transmissions in the respective PDCCH regions 700O, 700P, 700Q. Each PDCCH repeat transmission addressed to SI-RNTI in the PDCCH regions 700O, 700P, 700Q in effect comprises a duplication of the same downlink control information which a terminal device can combine to seek to establish the content of the PDCCH message addressed to SI-RNTI in accordance with conventional techniques for coverage extension through repeat transmissions. For this example implementation of a repeat-transmission based coverage extension scheme it is again assumed a particular type of message subject to repeat transmissions is addressed to the same RNTI (e.g. SI-RNTI for a system information related type of messages) as if the same type of message were subject to conventional single-subframe transmission. However, as discussed further below, in accordance with certain embodiments of the disclosure identifiers having different characteristics (e.g. in terms of their value or control region search space) may be used for a given type of message depending on whether the messages to be sent in accordance with a first transmission scheme (e.g. using a conventional single subframe based transmission approach) or a second transmission scheme (e.g. using a repeat-transmission scheme for coverage extension). Furthermore, it will be appreciated the approach of using identifiers associated with a particular type of message having different characteristics according to the transmission scheme is to be used in accordance with embodiments of the disclosure may or may not also implement an approach using validity periods as disclosed herein.

The PDCCH message sent in subframes O, P and Q in FIG. 7 differs from a conventional PDCCH message, for example of the kind transmitted in subframes A, B and C of FIG. 6, in that it is associated with a validity period that is sufficient to span the transmission of a plurality of PDSCH messages. This is different from the conventional approach in which a PDCCH message is simply associated with a single PDSCH message. The validity period for the PDCCH message is known to both the base station and the terminal device. For example, the validity period may be based on a defined standard for operations in accordance with an embodiment of the disclosure, whereby the base station and the terminal device can each determine the validity period from the defined standard. In other embodiments the base station may have flexibility to select the validity period, for example according to current scheduling requirements, and to communicate an indication of the validity period to the terminal device(s) to which the PDCCH message is addressed. Some example implementation of this approach are discussed further below.

The PDCCH message comprising the three repeat transmissions in the PDCCH regions of subframes O, P and Q indicate transmission resource blocks to be used for a subsequent PDSCH message comprising the transmission of system information. This PDSCH message itself comprises a plurality of repeat transmissions, and, in this example, are represented by shading in the PDSCH regions 702R, 702S and 702T of subframes D, E and F. The manner in which the PDCCH message indicates the corresponding PDSCH resources in subframes R, S and T may be in accordance with conventional techniques/signalling protocols. That is to say, the transmission resources, for example in terms of specific resource elements, used to convey the repeat transmissions of the system information message in the PDSCH regions 702R, 702S and 702T may be indicated in the corresponding PDCCH message addressed to SI-RNTI and comprising the repeat transmissions in PDCCH regions 700O, 700P, 700Q in accordance with conventional resource allocation techniques in the context of coverage extension using repeat transmissions. Whilst the shading in FIG. 7 schematically represents the same frequency resources being used for each repeat transmission in the respective PDSCH regions 702R, 702S and 702T of the subframes R, S and T, in principle the repeat-transmission approach may be configured to include frequency hopping for the different repeat transmissions comprising the PDSCH message sent in subframes R, S and T. The nature of any such frequency hopping may be pre-defined, for example it may be pre-specified according to an operating standard for the wireless telecommunications system, or it may be established in previous RRC (radio resource control) signalling, or it may be indicated in the PDCCH message.

As schematically represented in FIG. 7 there is a gap between subframes C and D. This again follows the currently-proposed approaches for repeat-transmission coverage extension whereby the transmission of a PDSCH message comprising a plurality of repeat transmissions does not start until after all repeat transmissions of the corresponding PDCCH message have been sent. Furthermore, some proposals indicate there should be no overlap between the end of the repeat transmissions comprising the PDCCH message and the start of the repeat transmissions comprising the PDSCH message. It will, however, be appreciated the specific implementation of such aspects of a repeat transmission approach for providing coverage extension are not significant to the principles underlying the present disclosure. That is to say, the principles described herein may equally be implemented in association with other repeat transmission approaches (e.g. with repeat transmissions of PDCCH and an associated PDSCH occurring in the same subframe).

Thus, the communication of the PDCCH message in subframes O, P and Q and the corresponding communication of the PDSCH message conveying system information in subframes R, S and T as represented in FIG. 7 may follow the same general principles as the approach represented in FIG. 6. Similarly, in subframes following the repeat-transmission approach for transmitting the system information message as schematically indicated in subframes R, S and T in FIG. 7, the wireless telecommunications system may continue to operate in accordance with its normal operating techniques for conveying other messages.

As noted above, system information messages are regularly retransmitted in accordance with LTE techniques, and the approach of FIG. 7 differs from the approach of FIG. 6 in respect of how a subsequent transmission of system information is scheduled on PDSCH in subframes X, Y and Z. In particular, the approach of FIG. 7 differs from the approach of FIG. 6 if the subsequent retransmission of system information occurs within the validity period associated with the previously-received PDCCH message in subframes O, P and Q initially sent in association with the previously-received system information message on PDSCH in subframes R, S and T. In LTE the transmission of system information follows a defined timing schedule, for example based on the system information window defined for the relevant system information. Thus, a base station and a terminal device are able to independently determine in which subframe a system information message will be transmitted on PDSCH (or which plurality of subframes in the case of coverage extension through repeat-transmissions as in this example). Thus, in the example of FIG. 7, a terminal device to which the system information is addressed can determine that a system information message is to be transmitted in subframes X, Y and Z.

Referring back to FIG. 6, the terminal device receiving the system information on PDSCH in subframes J, K and L can similarly determine in accordance with conventional techniques that the transmission will occur in these subframes. However, to determine the specific resources (e.g. in terms of specific OFDM carriers/resource blocks) on which the transmissions will occur within the relevant subframe(s) the terminal device must first receive the corresponding PDCCH allocation message sent in subframes G, H and I.

However, in the approach of FIG. 7 in accordance with an embodiment of the present disclosure the resource allocation used for the PDSCH transmissions of the system information message on subframes X, Y and Z is determined from the previous resource allocation message sent on PDCCH in subframes O, P and Q. For example, in accordance with one approach the specific PDSCH resources (e.g. in terms of frequency) to be used for transmitting the subsequent system information message in subframes X, Y and Z are assumed to be the same as the specific PDSCH resources (e.g. in terms of frequency) used for transmitting the system information message in subframes R, S and T and indicated in the PDCCH message sent in subframes O, P and Q. However, it will be appreciated that other mappings can be adopted. For example, the frequencies to be used can be configured to shift in accordance with a predefined pattern for each retransmission within the validity period for the PDCCH message.

Thus, in accordance with an embodiment of the disclosure, and in contrast to the approach in the corresponding subframes in FIG. 6, there is no PDCCH message sent in subframes U, V and W to support the system information message sent on PDSCH in subframes X, Y and Z. Instead it is determined that a previous PDCCH message remains valid (because its associated validity period has yet to expire), and the resources used for conveying the system information message on PDSCH in subframes X, Y and Z are derived from the previous PDCCH.

This approach has an advantage of freeing up the control-channel resources, in particular in subframes U, V and W for the example subframes represented in FIG. 7. The approach can also help reduce the amount of processing required by the terminal device (since the terminal device does not need to decode a separate PDCCH message for each and every PDSCH message). Furthermore the approach can reduce latency in situations that require high repetition numbers because there is no need to wait to receive a series of PDCCH repetitions before receiving each series of PDSCH repetitions.

It will be appreciated the transmission resources represented in FIG. 7 that are not involved in the SI message signalling discussed above can be used for other communications in the network in the usual manner. In particular, it will be appreciated that although the entirety of the PDCCH regions associated with repeat transmissions of the PDCCH for the system information messages are shown shaded in FIG. 7, this is merely to highlight those subframes in which a PDCCH for the system information messages is transmitted compared to those where it is not, and in practice these regions will comprise multiple PDCCH messages addressing different terminal devices for allocating resources for various different types of communication on PDSCH.

Thus, to summarise an approach in accordance with an embodiment of the disclosure as represented in FIG. 7, and with reference to FIG. 8, a base station 504 is transmitting system information messages to terminal devices, including terminal device 508, according to a pre-defined timing schedule. The predefined timing schedule may follow conventional LTE techniques for transmitting system information. It is assumed the processing represented in FIG. 8 starts just prior to subframe O at the beginning of the series of subframes represented in FIG. 7 and while there is no currently valid PDCCH message for the relevant system information. Thus, in a first step S1 in FIG. 8 the base station determines a validity period that is to apply for an upcoming control-plane message that is to be transmitted to allocate resources for system information messages on PDSCH. The duration of a validity period for a given PDCCH message may be fixed/predetermined according to a specific implementation, for example by a network operator, or may be selectable by a base station according to current conditions. The validity period might be relatively short, for example it might only comprise the time required to transmit two PDSCH messages to provide a potential saving of one PDCCH message transmission. On the other hand, the validity period might be significant number, for example hundreds, thousands, tens of thousands, or even more subframes. In general a longer validity period may be preferred to reduce the number of PDCCH message transmissions, while an overly-long validity period may be considered to overly restrict scheduling flexibility. An appropriate validity period in a given situation may depend on current traffic conditions within a cell supported by a base station. For example, if a base station is currently supporting a large number of terminal devices it may be more appropriate to select a relatively long validity period to provide a correspondingly large saving in PDCCH message transmissions. However, if a base station is currently supporting only a small number of terminal devices with low traffic requirements (i.e. such that PDCCH congestion is not an overly significant concern), it may be more appropriate to select a relatively short validity period to provide a corresponding increase in scheduling flexibility (example to take better account of fluctuations in radio propagation conditions or traffic changes). In one example a current proportion of non-MTC traffic may be used to help determine an appropriate validity period for a repeated PDCCH. Generally speaking, the higher this proportion, the higher the proportion of non-delay-tolerant non-small-message terminal devices in the cell whose performance may be disrupted by a heavy use of control channel resources due to repeated PDCCH transmission. Therefore, as the proportion of relatively higher priority terminal devices (e.g. non-MTC terminal devices) increases, the base station may opt for longer PDCCH validity times, especially for use in association with SI-messages.

In step S2 the base station transmits a control-plane message, which can also be referred to as a control message (using repeat transmissions for coverage extension in this example) to allocate the resources for subsequent system information messages on PDSCH. This control message is received and decoded by the terminal device 508. This aspect of the operation may be based generally on conventional techniques, for example using a PDCCH message addressed to an SI-RNTI in LTE. Furthermore, the specific resources selected by the base station for allocation to the system information messages may be selected in accordance with established scheduling techniques in wireless communication systems. Thus, step S2 correspond with the transmissions made in subframes O, P and Q of FIG. 7.

In step S3 the terminal device determines the validity period for the control-plane message received in step S2. There are various ways in which the terminal device may determine the validity period for the control-plane resource allocation message in accordance with various embodiments of the disclosure, and some examples are discussed further below.

In step S4 the base station proceeds to transmit a system information message (using repeat transmissions for coverage extension in this example) in accordance with the resource allocation identified by the control-plane (PDCCH) message of step S2. This aspect of the operation may be made broadly in accordance with conventional techniques. The terminal device seeks to receive and decode this system information message (SI message #1) in accordance with conventional techniques.

In step S5 the base station determines it is time to transmit another system information message (SI message #2) according to the predefined timing for periodic system information transmissions in the wireless telecommunications system. The base station further determines the validity period for the control-plane message sent in step S2 has not yet expired. Accordingly, the base station does not send any new control-plane message to support the new system information message that is about to be transmitted (SI message#2). Instead the base station proceeds to transmit the system information message (using repeat transmissions for coverage extension in this example) in accordance with resource allocations derived from the previously-sent control-plane (PDCCH) message of step S2. For example, the base station may be configured to simply use the same frequency resources for transmitting SI message #2 in step S5 as were used for transmitting SI message #1 in step S2. The terminal device likewise determines the expected transmission timing for the new system information message (SI message #2) from the predefined timing for system information transmissions and also determines the validity period for the previous control-plane message received in step S2 has not expired. Accordingly, the terminal device need not seek to receive a new control-plane message to indicate the PDSCH resources for the new system information message that is to be next transmitted (SI message#2). Instead the terminal device simply assumes the transmission is to be made in the relevant subframes (determined according to the predefined timing) on frequency resources derived from the previously-sent control-plane (PDCCH) message of step S2. Once the terminal device has determined the specific resources on which to expect the system information message in step S5 (SI message #2) it may proceed to receive and decode the system information message in accordance with conventional PDSCH transmission techniques.

As noted above the timing s for specific SI messages in LTE are based on SI windows. Conventionally it is the transmission of an associated PDCCH message addressed to the relevant system information RNTI which determines the precise subframe(s) in which the system information message PDSCH is transmitted. However, in accordance with certain embodiments of the disclosure there can be PDSCH messages conveying system information in an SI windows without there being a corresponding PDCCH message in that SI window. There are a number of different ways in which a terminal device can determine the relevant subframe for a further PDSDH message transmitted within the validity period of a previously-received PDCCH message in accordance with embodiments of the disclosure. In one case, the base station may be configured to send the PDSCH message in a predefined subframe of the SI window. In principle this could be permanently fixed for all PDSCH system information messages at the cost of reduced scheduling flexibility. In another case the subframe(s) could be based on the subframe(s) used in association with the initial PDCCH message. For example, if the initial PDCCH indicates a system information message is to be sent in subframe number n (or starting in subframe n for repeat transitions for coverage extension) within a particular SI window, subsequent PDSCH messages within the validity period of the PDCCH might also be sent in (or start in) subframe n of the relevant SI window. In another example, the base station may retain the flexibility to send (or start sending when using repeat transmissions) the subsequent system information message in any subframe within the SI window. In this case a terminal device may check for a newly addressed PDCCH message in the subframes in the SI window in the normal way, and if a new PDCCH message is not found, the terminal device may decode the PDSCH resources indicated in accordance with a previously-received still valid PDCCH message in the same subframe(s) relative to the SI window as for the previous transmission. In principle, with sufficient processing power, the terminal device could simply seek to decode the relevant resources in all subframes of an SI window to see if an SI message can be decoded.

The process of the base station sending further system information messages, and the terminal device receiving the further information messages, based on transmission resource allocation information indicated in the control-plane message of step S2 may continue (as schematically indicated in step S6 for transmitting SI message #n) until the validity period for the control-plane message received in step S2 has expired, as schematically indicated in step S7.

Following step S7 the processing in effect cycles back to where it started prior to step S1. The base station may thus determine a new validity period for a new control message to be sent in a further step corresponding with step S2 (the base station determines that a new PDCCH message is required because the previous one has expired). Processing may then continue from this point in the manner discussed above.

Thus, the various example schemes represented in FIGS. 7 and 8, and described above, provide an approach in which control-plane messages, and in particular SI-messages, are associated with a validity period that extends for more than one message transmission of the associated PDSCH. For example, for SIBs in SI-messages, one SI-RNTI addressed PDCCH message can provide the control information for multiple transmissions of SIBs, and in general over multiple SI-windows. Similar operation for other types of message, for example messages addressed to other common search-space RNTIs, may be adopted in accordance with other examples. This kind of approach can help reduce control resource requirements, which can be especially important in the context of coverage extension where according to conventional techniques PDCCH (comprising multiple repeat transmissions) messages would have to be transmitted every time an SI-message (comprising multiple repeat transmissions) needed to be sent.

As noted above, SIBs in system information messages can in some cases remain unchanged for extended period, for example a few hours. A terminal device may thus combine system information message transmissions from across multiple SI-windows if it does not successfully decode an SI-message at first attempt and with a sufficiently long validity period this can be achieved in accordance with the approaches described herein with reduced control signalling requirements than current schemes.

As noted above, there are various different ways in which the validity period for a PDCCH message may be established. In one simple example the period may be defined according to an operating standard of the wireless telecommunications system. Both the base station and the terminal device can in effect be hardwired with the validity period (or multiple validity periods associated with different types of messages). In another example the base station may have flexibility for determining a suitable validity period according to the implementation and traffic conditions at hand. In this case there are various different ways in which the validity period could be conveyed to a terminal device.

In one example the base station may be configured to convey a selected validity period to terminal devices by selecting a particular transmission characteristic, for example timing, for the PDCCH message with which the validity period is associated. According to current proposals for repeat transmission coverage extension in LTE, the starting subframe of a PDCCH message being transmitted in multiple subframes should be confined to a subset of subframes. This is because in some circumstances the terminal device may be required to blindly search over the possible numbers of repetitions the PDCCH might comprise. If it were allowed for a PDCCH messages comprising an arbitrary number of repeat transmissions to start in an arbitrary subframe this could be expected to give rise to significant complexity in the processing required of the terminal device. To address this there has been proposed an approach in which, for example, a PDCCH message comprising N repeats can only begin in subframes having a subframe number that is a multiple of N (i.e. 0, N, 2N, 3N, . . . ). This reduces the set of possible repetition numbers the UE needs to consider per subframe. Thus, a similar approach could be used to convey information on PDCCH validity. This can be done by linking the validity period to the starting subframe number of the associated PDCCH message. For example, a PDCCH message commencing in subframe M might be taken to indicate a validity period corresponding to M SI-windows for the relevant system information. Thus, a terminal device can readily establish the relevant validity period from the timing of the relevant control-claim message. It may be noted that in some circumstances it may be preferable to assign longer PDCCH validity periods to PDSCH messages that comprise high numbers of repetitions.

In another example the base station may be configured to convey a selected validity period to terminal devices through explicit signalling, for example in the downlink control information (DCI) of the relevant PDCCH message. Thus, the DCI may comprise an indication of a number of subframes/radio frames corresponding to the validity period or may comprise an indication of a specific subframe/radio frame in which the validity period is to expire. In the application to the transmission of system information messages it may be preferable to indicate timings in respect of a number of SI-windows of validity.

In yet another example the terminal devices may be configured to simply assume the validity period for a given PDCCH message addressed to a given RNTI (e.g. SI-RNTI) extends until a subsequent PDCCH message addressed to the relevant RNTI is received. That is to say, the PDCCH message may be considered to remain valid until it is replaced by another PDCCH message. In this respect, in terms of the processing schematically represented in FIG. 8, this corresponds with the terminal device determining the validity period for the control message (corresponding to step S3) at the same time at which the validity period expires (responding to step S7), with this being triggered by a new PDCCH message being received by the terminal device. In this approach a terminal device may thus monitor for a new PDCCH message addressed to the relevant RNTI in each subframe of each SI-window in the normal way until a new PDCCH message is received to in effect define the end the validity period for the previous PDCCH message addressed to that RNTI.

Thus, one principle of the approaches described above in accordance with some embodiments of the disclosure is to associate a PDCCH message with a time defining its validity, that time being extensible beyond the time taken to convey a corresponding PDSCH message. A terminal device may thus assume the PDSCH resource allocation, MCS (modulation and coding scheme), TBS (transport block size), etc. in the DCI of the PDCCH message is valid for receiving multiple PDSCH messages during the PDCCH validity time. No further PDCCHs for multiple PDSCH messages need be sent during the validity time. Thus, in the case of SIB transmissions, the transmission of all SI-messages (including all transmissions within a SI-window of a particular SI-message), may be scheduled with a single transmission of SI-RNTI PDCCH with an appropriately configured validity period.

One particular situation in which approaches in accordance with the embodiments described above might be expected to be useful is where the transmissions are used to provide coverage extension on both PDCCH and PDSCH. However, similar principles can be applied where coverage extension is not being used, for example in respect of messages sent within single subframes.

Whilst the above-described embodiments have focused on system information messages, it will be appreciated that similar principles can be applied for other types of messages in wireless telecommunications systems, and especially for messages which rely on resource allocations occurring with some degree of predictable timing. For example, similar principles can be used for control signalling addressed to other common search space RNTIs, such as RA-RNTI and P-RNTI.

Thus a random access RNTI addressed PDCCH message received by a terminal device during an initial cell access may be associated with a validity period such that the transmission resources identified in association with the random access RNTI PDCCH message are taken to apply for later random access procedures in accordance with the principles set out above. The specific subframe of a RAR (random access response) window in which a subsequent RAR arrives can be established in a manner similar to that described above for system information within a predefined series of subframes comprising an SI-window Similarly, a paging RNTI addressed PDCCH message may be associated with an extended validity in accordance with the principles described above. Thus a PDSCH resource allocation associated with a PDCCH message addressed to a paging RNTI transmitted in one subframe may be taken to indicate a PDSCH resource allocation in a subsequent subframe within a validity period associated with the PDCCH message. This may be especially appropriate for paging when a terminal device is in idle mode since there is a higher degree of predictability as to when paging messages may be sent according to a currently configured DRX, discontinuous reception, cycle. That is to say, the concept of PDDCH validity timers as discussed herein may be applied to the most recent P-RNTI PDCCH used to decode a paging message by an RRC_IDLE UE. An RRC_IDLE UE is only expected to monitor specific subframes for P-RNTI and is in DRX for other subframes. If the relevant PDCCH validity timer expires before a subsequent paging message is to be sent, the base station may provide a new P-RNTI PDCCH message to schedule the next paging message as normal. Otherwise the IDLE UE may assume the most recent such PDCCH is still valid. For an RRC_CONNECTED UE, there is less predictability as regards whether a particular subframe should contain P-RNTI PDCCH or not. For a connected mode terminal device the principles described herein for paging messages might, for example, be used for subframes in which the UE would check for P-RNTI if it were in fact in IDLE mode. In other subframes the base station may send conventional paging signalling using PDCCH to page the UE in connected mode.

In a wireless telecommunications using repeat-transmissions for coverage extension there may be terminal devices which are not in coverage-limited locations and able to successfully decode individual ones of the PDCCH (or EPDCCH) repeat transmissions in each subframe. For example, and referring to FIG. 7, a non-coverage-limited terminal device may be able to successfully decode the individual PDCCH repeat transmission in the control region 700O of subframe O. If this terminal device is not aware of the use of repeat-transmissions for coverage extension (for example because it is a legacy/conventional terminal device) it might be expected to assume the PDCCH information derived from the control region 700O subframe O applies to a system information transmission on PDSCH in the same subframe (i.e. in PDSCH region 702O). However, the terminal device would fail to receive the system information transmission (because it is not sent in accordance with this particular repeat-transmission protocol). Potentially this terminal device could seek to do this for each and every repeat transmission and so waste a considerable amount of processing effort needlessly decoding individual PDCCH repeat transmissions and associated PDSCH resources in the expectation of receiving system information messages which are not in fact being sent in those subframes. This is an issue which applies generally for repeat transmission approaches for coverage extension and is not specific to approaches based on validity periods as discussed herein.

Thus in accordance with certain embodiments of the disclosure an identifier (RNTI) having different characteristics (e.g. in terms of value or associated control region search space) may be associated with SI messages sent using a repeat transmission approach as compared to SI messages sent without using a repeat transmission approach. More generally, in a wireless telecommunications system supporting different transmission schemes for a given type (classification/category) of message (e.g. a message comprising a given radio resource control, RRC, information element, such as a system information related message or a paging request related message), a characteristic of an identifier associated with the message (i.e. an identifier to indicate which terminal device(s) the message is for) may be selected according to the transmission scheme used for the message. This approach may be implemented in accordance with certain embodiments of the disclosure regardless of whether the wireless telecommunications system also implements an approach using validity periods as described herein (i.e. the approach may be implemented in association with the principles of the repeat transmission scheme represented in FIG. 6 as well as that represented in FIG. 7). That is to say, the concept of associating a validity period with a control message and the concept of using different identifier characteristics according to a transmission scheme being used may be used together in combination or separately from one another in accordance with different embodiments of the disclosure.

A terminal device having the ability to receive transmissions using the repeat transmission approach can identify the transmissions as such directly from the associated identifier characteristic and receive the message accordingly. The characteristic for the identifier can be selected so that a terminal device not having the ability to receive transmissions using a repeat transmission approach, for example a legacy terminal device, does not recognise the message as being addressed to the terminal device, and so in effect ignores it. Such a terminal device may in effect ignore the message because, for example, the identifier has a value which is not recognised as a value relevant to the terminal device or because a search space for a control message conveying the identifier is not searched by the terminal device.

Thus, if in a particular implementation it is assumed that a repeat transmission approach to coverage extension is intended primarily for MTC-type devices, an MTC-specific system information radio network temporary identifier (MTC-SI-RNTI) may be established. PDCCH messages associated with repeat transmissions for conveying system information messages may thus be addressed to MTC-SI-RNTI instead of an SI-RNTI used for conveying system information that is not sent using repeat transmissions. More generally some embodiments of the disclosure propose introducing other repetition specific RNTIs to address messages that rely on repetitions for coverage extension to complement corresponding RNTIs in existing systems. Thus, system information messages to be sent in accordance with a non-repeat transmission technique may be associated with a conventional system information identifier (e.g. SI-RNTI) while system information messages to be sent in accordance with a repeat-transmission technique may be associated with a modified system information identifier (e.g. REPEAT-SI-RNTI).

Similar issues can arises for other common RNTIs associated with other types of message that may be sent using a repeat transmission approach. Thus corresponding RNTIs having different characteristics may also be established for these. For example, for each of SI-RNTI, P-RNTI, RA-RNTI, TPC-PUCCH-RNTI, TPC-PUSCH-RNTI and M-RNTI to be used for addressing non-repeat transmission messages, there may be established a corresponding RNTI having a different value to be used for addressing repeat-transmission messages (e.g. what might be generally referred to as REPEAT-RNTIs, such as REPEAT-SI-RNTI, REPEAT-P-RNTI, REPEAT-RA-RNTI, REPEAT-TPC-PUCCH-RNTI, REPEAT-TPC-PUSCH-RNTI and REPEAT-M-RNTI). Thus an approach in accordance with an embodiment of the disclosure may be used in association with messages selected from the group comprising: (i) a message associated with transmitting system information; (ii) a message associated with transmitting a paging message; (iii) a message associated with transmitting a random access response message; (iv) a message associated with transmitting power control information for an uplink control channel; (v) a message associated with transmitting power control information for an uplink data channel; and (vi) a message associated with a broadcast and/or multicast service. A similar approach can be taken for types of message associated with other common RNTIs which may be introduced in future.

In some implementations in which a message to be transmitted using a repeat-transmission approach in association with an identifier having a characteristic selected to indicate this, a component part of the message (e.g. a repeat transmission) may also be transmitted in one, or more, subframes in association with an identifier having a characteristic that would be used if the message were being transmitted using a conventional single-transmission approach. This will allow legacy terminal devices who are able to receive the message from only a single repeat transmission to in effect receive the message based on one of the repeat transmissions.

One advantage of associating identifiers for a given type of message with different characteristics based on the transmission scheme is the potential for more complete use of the available transmission resources. For example, referring to FIG. 7, the initial SI-RNTI addressed PDCCH repeat transmission in the control region 700O of subframe O is part of a repeat transmission comprising three repeat transmissions in the respective control regions of subframes O, P and Q. This PDCCH message identifies resources (and other parameters) associated with a PDSCH message to be subsequently transmitted starting from subframe R as discussed above. As previously noted, it is expected for repeat-transmission based coverage extension there will be no PDSCH signalling associated with the PDCCH message until after the repeat transmissions comprising the PDCCH message had been made. In principle the PDSCH transmission resources in the PDSCH regions 702O, 702P and 702Q of subframes O, P and Q corresponding to the resources allocated by the PDCCH message for use in subframe starting from subframe R could be used to support other transmissions. For example, the respective control regions 700O, 700P, 700R could include conventional single-subframe PDCCH messages allocating the relevant PDSCH transmission resources for another purpose, for example unicast data. However, it would be confusing for a legacy terminal device to decode a unicast PDCCH message and a SI PDCCH message resource allocation identifying the same resources in the same subframe. Thus by preventing the legacy terminal device from decoding the SI PDCCH signalling (through use of an appropriate distinguishing characteristic for the identifier as discussed herein), the legacy terminal device is free to receive unicast data on the relevant PDSCH resources (in association with an appropriately addressed PDCCH transmission indicating these resources).

In implementations in which the distinguishing characteristic for the identifier is its value (i.e. with one value, such as SI-RNTI, indicating conventional single-subframe transmission, and another value, such as REPEAT-SI-RNTI, indicating repeat-transmission coverage extension), the "new" REPEAT-RNTIs may be defined in accordance with an operating standard for the wireless telecommunications network in parallel with the corresponding RNTIs. For example, as noted above, in LTE the SI-RNTI has a fixed value 0xFFFF. In accordance with an embodiment of the disclosure a fixed value for a REPEAT-SI-RNTI may be selected from one of the currently reserved RNTIs in LTE (from 0xFFF4 to 0xFFFC). Thus, if, for example, a value 0xFFF5 is allocated as REPEAT-SI-RNTI (i.e. an identifier for a system information related message sent using repeat transmissions), a PDCCH addressed to 0xFFFF can be identified as corresponding to a system information message sent without repetition whereas a PDCCH addressed to 0xFFF5 can be identified as corresponding to a system information message sent using repetition. A terminal device that is unaware of repetition will in effect ignore the PDCCH addressed to 0xFFF5 as this will not be recognised as a valid RNTI for the terminal device. Corresponding principles apply where EPDCCH is used.

In the above-described example the value of the RNTI is the characteristic used to distinguish between the different transmission schemes. However, in accordance with other embodiments of the disclosure, other characteristics can be used to distinguish identifiers to indicate different transmission schemes. For example, in LTE there are currently eight "spare" values that could be used as new REPEAT-RNTIs. This is a sufficient number of values to provide a corresponding RNTI to be used in association with a transmission scheme comprising repeat transmissions for all currently-existing common RNTIs. However, it may be considered preferable in some cases to avoid using these "spare" values so they remain free for other uses, or there may be a need for more REPEAT-RNTIs (for example, to provide multiple extra RNTI for a given type of message, e.g. a system information message, to indicate another aspect of the transmission scheme, for example the number of repeats). Thus, in accordance with some embodiments a REPEAT-RNTI may in fact have a value that is the same as its corresponding "conventional" RNTI (e.g. 0xFFFF for SI-RNTI and REPEAT-SI-RNTI) but be associated with a different search space. As is well known a terminal device will typically search a defined subset of control region resources to seek to identify any control messages associated with an identifier (RNTI) common to a plurality of terminal devices. The subset of control region resources is known as a search space and comprises a plurality of candidate PDCCH for the terminal device to check. This search space approach is taken to reduce the amount of processing required by the terminal device to seek to identify any relevant control messages. Thus, PDCCH signalling associated with the existing common RNTIs are constrained to a particular set of candidate PDCCH comprising the common search space. In accordance with some embodiments of the disclosure the characteristic of the identifier which is used to distinguish the different potential transmission schemes may be based on the specific PDCCH resources used.

For example, a PDCCH message to be transmitted in accordance with a conventional single-subframe approach may be associated with an identifier, such as SI-RNTI, in the common search space in the usual way. However, a PDCCH message to be transmitted in accordance with a repeat-transmission approach may instead be associated with the same value of identifier, such as SI-RNTI, but transmitted on PDCCH resources outside the common search space. Thus in accordance with some implementations the distinguishing characteristic for the identifier based on the transmission scheme may be a search space with which the identifier is associated. Thus a PDCCH message addressed to SI-RNTI within a particular search space (e.g. the common search space in LTE) can be identified as corresponding to a system information message sent without repetition whereas a PDCCH transmission addressed to SI-RNTI outside the particular search space (e.g. outside the common search space in LTE) can be identified as corresponding to a system information message sent using repetition. A terminal device that is unaware of repetition will in effect ignore the PDCCH addressed to SI-RNTI outside the common search space as the terminal device will not search for the SI-RNTI outside the common search. Corresponding principles apply where EPDCCH is used. Thus in effect, identifiers associated with repeat transmissions may be associated with a newly-defined search space which is outside the search space used for the corresponding identifiers for conventional single-subframe transmissions. In some examples the new search space may support only a single aggregation level, for example an aggregation level 8 (the high aggregation level being appropriate in view of the coverage extension context). The new search space may be smaller (i.e. comprise fewer candidate PDCCH) than the search space for existing common RNTIs. This can help reduce the blind search load associated with the repeat transmissions comprising a message transmitted using a repeat transmission for coverage extension.

It will appreciated the advantages of establishing a new search space comprising a reduced number of candidate PDCCHs with a single relatively high aggregation level to be used in association with identifiers for repeat transmission messages can be applied even in circumstances where different identifier values are associated with the different transmission schemes. In such cases the repeat-specific identifier values may be selected from among the values that are available for use as identifiers in the wireless telecommunications system. In one example, as referred to above, a repeat-specific identifier values may simply match its corresponding non-repeat specific identify value (e.g. SI-RNTI) with the different search space in which a control message associated with the identifier is transmitted providing the distinguishing characteristic for the identifier for the selected transmission scheme. However, in another implementation the repeat-specific identifier values may be selected from, for example, identifiers available for other uses, for example in LTE from identifiers available for cell-specific RNTIs (which may range from 0x001 to 0xFFF3). This approach can in principle provide a relatively large number of repeat-specific identifiers. For example, one or more of the values normally used for C-RNTI can be in effect reserved as one or more repeat-specific RNTIs, such as REPEAT-SI-RNTI in the terminology used above, and likewise for types/classes/ classifications of messages other than system information related messages, such as paging messages and random access a response messages etc. Thus a base station could in effect reserve (re-allocate) in its cell a number of RNTI values for one purpose as actually being for use as repeat-specific RNTIs. If any of the re-allocated subset of RNTIs comprising the repeat-specific RNTI is detected by a terminal device as addressing a PDCCH in the newly-defined search space, the terminal device may be configured to interpret this as a repeat-specific RNTI. This may be based on the base station conveying in previous signalling to terminal devices that support repeat-transmission communications an indication of the relevant RNTI(s). Alternatively, or in addition, the relevant RNTI(s) may be defined in accordance with an operating standard of the network for reallocation within the new search space. If the PDCCH candidates comprising the new search space do not overlap with those of the pre-existing common search space and UE-specific search space used by legacy devices, then the RNTIs allocated as repeat-specific RNTIs within the new search space could continue to be used in the other search space without giving rise to the potential for confusion for legacy terminal devices. If, on the other hand, the PDCCH candidates comprising the new search space do overlap with those of the pre-existing common search space or UE-specific search space, then the base station may be configured to avoid allocating any of a currently re-allocated RNTI to terminal devices in accordance with the usual function for the RNTI (i.e. a C-RNTI reallocated for use as a repeat-specific identifier should not be allotted to a terminal device for use as a C-RNTI). This can be remedied as a straightforward matter of RNTI scheduling (for example, the base station can in effect simply treat the re-allocated RNTIs as being already allotted for use).

If multiple RNTI are made available for use for a given type of message, the particular RNTI selected for use in association with a particular message may be used to indicate a further characteristic of the message, for example a number of repeats or a specific PDCCH validity period where implemented. This can provide the base station with a simple mechanism for modifying the specific repeat and all validity period parameters associated with a particular message, thereby improving overall flexibility.

Determining which identifiers a terminal device should search for to seek to identify messages to be sent to the terminal device using a repeat transmission scheme can be done in accordance with the usual principles by linking it to transmission mode (TM) configuration. In one implementation the repeat-specific RNTIs provided in accordance with embodiments of the disclosure might apply in all transmission modes as the principles governing their use will in many respects be similar to conventional, search space RNTIs. There could also be a link with the category/type of the terminal device. For example, a new terminal device category identifier could be introduced (e.g. category 0) to indicate the terminal device is a particular type of terminal device, for example an MTC-based terminal device. The repeat-specific identifiers may then be considered to apply to all transmission modes for terminal devices of category 0 (if the repeat-transmission based scheme is limited to category 0 terminal devices), as well as for additional terminal device categories if the use of the repeat-transmission based scheme is more widely supported.

Figure 9:
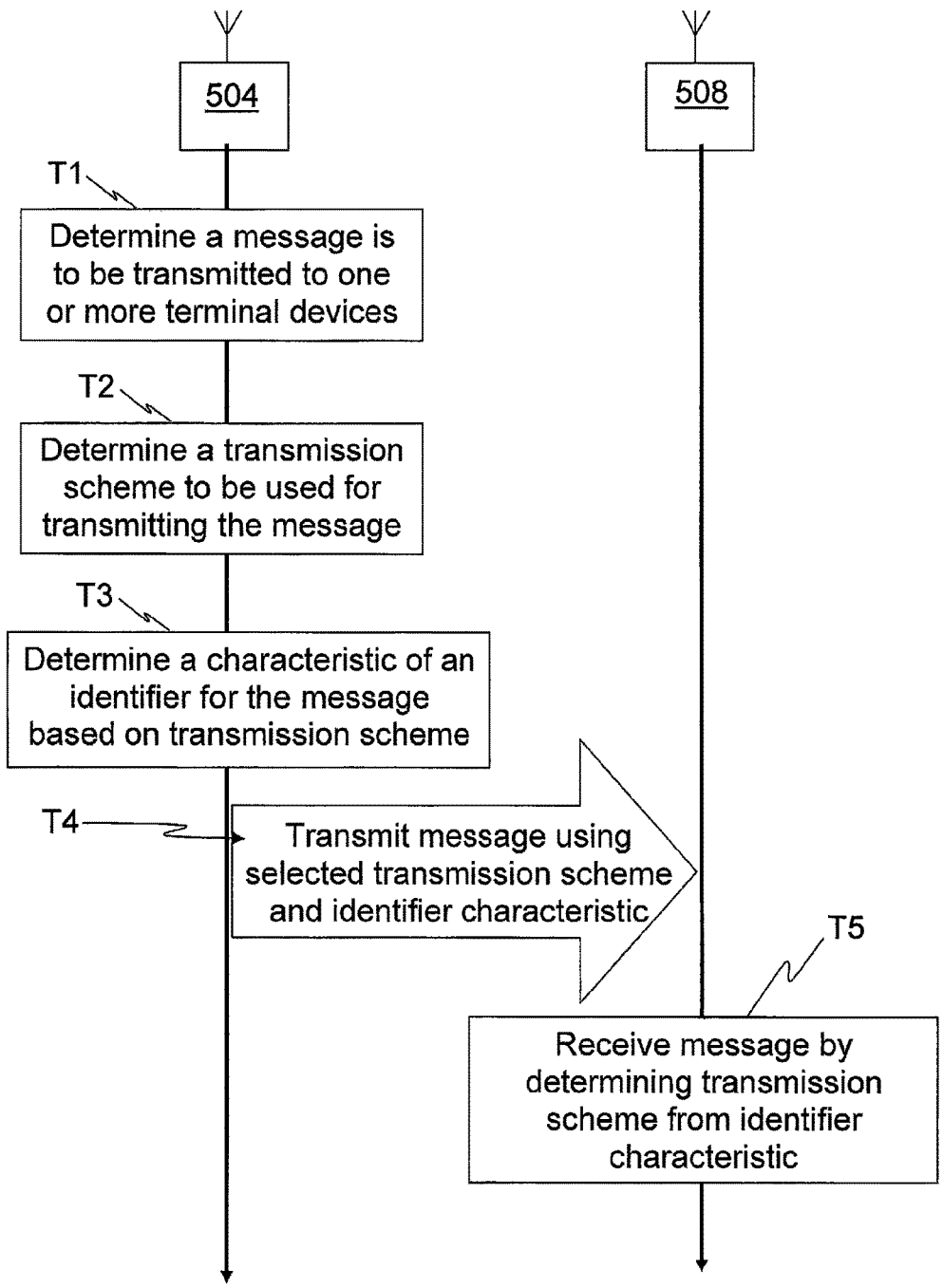
FIG. 9 is a signalling ladder diagram representing communications between a base station and a terminal device operating in accordance with another embodiment of the disclosure.

FIG. 9 is a signalling ladder diagram schematically representing modes of operation for the terminal device 508 and the base station 504 schematically represented in FIG. 5 in accordance with some embodiments of the present disclosure.

Processing begins in step T1 when the base station determines that a message is to be transmitted to one or more terminal devices. The message may, for example, be a broadcast message or a multicast message. The determination that a message is to be transmitted may be made in accordance with conventional operating procedures for the wireless communications system. For example, if the message is a system information message, step T1 may arise in accordance with a conventional timing schedule for transmitting system information messages. If the message is a paging message, step T1 may arise because an event has arisen which requires a terminal device to be paged. In this example it is assumed the message which is to be transmitted is a system information message which is relevant for (i.e. address to an identifier associated with) terminal device 508. Furthermore, it is assumed the message may be transmitted in accordance with either one of a first transmission scheme using transmission resources in a first number of radio subframes (e.g. using conventional single-subframe transmission) or a second transmission scheme using transmission resources in a plurality radio subframes (e.g. using repeat-transmission for coverage extension).

In step T2 the base station determines which of the first and second transmission schemes are to be used for transmitting the message. That is to say, in this example, the base station determines whether or not a conventional single subframe approach or a repeat-transmission approach for coverage extension will be used for the message. There are a number of factors that may govern this determination, either individually or in combination. For example, the terminal devices in the wireless telecommunication system may comprise a first set of terminal devices and a second set of terminal devices step and T2 may be based on whether the one or more terminal devices to which the message is to be sent comprises terminal devices in the first or second sets. For example, the first set of terminal devices may comprise terminal devices that do not require coverage extension techniques to receive messages (or simply do not support coverage extension), whereas the second set of terminal devices may comprise terminal devices that do require coverage extension techniques to receive messages (and support repeat-transmission based coverage extension). Whether or not a specific terminal device requires coverage extension may, for example, be based on a measured radio propagation metric associated with the terminal device, for example a path loss, block error rate, a bit error rate, a packet error rate, a frame error rate, a symbol error rate, or negative or positive acknowledgement signalling rate (ACK/NACK) associated with communications with the terminal device. In another implementation the decision may take account of a specific identity or category for the one or more terminal devices to which the messages to be sent.

In step T3 the base station determines a characteristic of an identifier for the message based on the transmission scheme determined in step T2. This characteristic may be selected in accordance with any of the principles discussed above (e.g. use of different values for the identifier or different search spaces to be used with the identifier).

In step T4 the message is transmitted in accordance with the transmission scheme determined in step T2 and in association with an identifier, e.g. RNTI, having the characteristic determined in step T3. For example, the message may be transmitted in accordance with a repeat-transmission scheme as described herein with an identifier selected to have a characteristic to identify this, for example in accordance with any of the principles discussed above. In this regard the message may comprise one or other or both of a control message transmitted on a downlink control channel, e.g. a PDCCH message and another message transmitted on a downlink data channel, e.g. PDSCH (i.e. such that the identifier is transmitted separately from the message).

In step T5 the terminal device receives the transmitted signalling from the base station and determines the transmission scheme being used from the characteristic of the identifier. The terminal device may then proceed to receive and decode the message in accordance with the transmission scheme being used.

Thus, the process represented in FIG. 9 demonstrates a mechanism by which a base station can readily indicates to terminal devices the transmission scheme being used for a given message. Once the terminal device has determined the transmission scheme, subsequent operation, for example in terms of receiving the message, they be performed in accordance with conventional principles for receiving such messages. Furthermore, these techniques may be modified to incorporate a validity period approach such as discussed above.

Thus there has been described a wireless telecommunication system that comprises a base station and a terminal device communicating over a radio interface. The radio interface supports a downlink control channel for conveying control messages from the base station to the terminal device and a downlink data channel (e.g. a physical downlink shared channel) for conveying other messages from the base station to the terminal device. The control messages convey information on resource allocations for the other messages on the downlink data channel. The other messages may comprise user-plane messages or control-plane messages. The terminal device is configured to receive a control message from the base station conveying an indication of allocated transmission resources on the downlink data channel and determine a validity period for the control message. During the validity period for the control message the terminal device is configured to receive a plurality of the other messages from the base station on the downlink data channel using the allocated transmission resources.

There has also been described a wireless telecommunication system that comprises a base station arranged to communicate messages to one or more terminal devices over a radio interface. The radio interface has a radio frame structure comprising a plurality of subframes, wherein a message may be transmitted in accordance with a first transmission scheme using transmission resources in a first number of radio subframes (e.g. one subframe) or transmitted in accordance with a second transmission scheme using transmission resources in a second number of radio subframes (e.g. with repeat transmissions in a plurality of subframes). The message is transmitted in association with an identifier to indicate a terminal device to which the message is addressed. A characteristic for the identifier, for example a value or control region search space for the identifier, is dependent on whether the message is to be transmitted in accordance with the first transmission scheme or the second transmission scheme. A terminal device to which the message is addressed determines the transmission scheme from the characteristic of the identifier and receives the message accordingly.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following two groups of numbered paragraphs:

Group 1 of numbered paragraphs:

Paragraph 1. A method of operating a terminal device communicating with a base station in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the method comprises receiving a control message from the base station conveying an indication of allocated transmission resources on the downlink data channel, determining a validity period for the control message, and receiving a plurality of other messages from the base station on the downlink data channel using the allocated transmission resources within the validity period for the control message.

Paragraph 2. The method of paragraph 1, wherein the other messages comprise system information messages.

Paragraph 3. The method of any preceding paragraph, wherein the system information messages comprise one or more system information blocks.

Paragraph 4. The method of any preceding paragraph, wherein the radio interface is based on a radio frame structure comprising a plurality of subframes, wherein each subframe comprises a control channel region for supporting the downlink control channel and a shared channel region for supporting the downlink data channel, and wherein respective ones of the control and/or the other messages comprise transmissions over a plurality of subframes.

Paragraph 5. The method of any preceding paragraph, wherein the validity period for the control message is determined in dependence on an identifier used in association with the control message.

Paragraph 6. The method of paragraph 5, wherein the identifier comprises an indication of one or more terminal devices to which the control message is addressed.

Paragraph 7. The method of any preceding paragraph, wherein the validity period for the control message is determined in dependence on a transmission characteristic of the control message.

Paragraph 8. The method of paragraph 7, wherein the transmission characteristic of the control message comprises a transmission time associated with the control message.

Paragraph 9. The method of any preceding paragraph, wherein the radio interface is based on a radio frame structure comprising a plurality of subframes, and wherein the timing of a subframe used to convey a first one of the plurality of other messages is used to determine the timing of a subframe used to convey a second one of the plurality of other messages within the validity period for the control message.

Paragraph 10. The method of any preceding paragraph, wherein the timing of a subframe used to convey the first one of the plurality of other messages relative to a first predefined range of subframes is used to determine the timing of a subframe used to convey the second one of the plurality of other messages relative to a second predefined range of subframes.

Paragraph 11. The method of any preceding paragraph, wherein the validity period is determined in dependence on a validity period indicator received in association with the control message.

Paragraph 12. The method of any preceding paragraph, wherein the validity period is determined in dependence on the time at which a subsequent control message is received.

Paragraph 13. The method of any preceding paragraph, wherein the other messages comprise random access response messages and/or paging messages.

Paragraph 14. A terminal device for communicating with a base station in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the terminal device comprises a controller unit and a transceiver unit configured to operate together to receive a control message from the base station conveying an indication of allocated transmission resources on the downlink data channel, to determine a validity period for the control message, and to receive a plurality of other messages from the base station on the downlink data channel using the allocated transmission resources within the validity period for the control message.

Paragraph 15. Circuitry for a terminal device communicating with a base station in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the circuitry comprises a controller element and a transceiver element configured to operate together to cause the terminal device to receive a control message from the base station conveying an indication of allocated transmission resources on the downlink data channel, to determine a validity period for the control message, and to receive a plurality of other messages from the base station on the downlink data channel using the allocated transmission resources within the validity period for the control message Paragraph 16. A method of operating a base station communicating with a terminal device in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the method comprises transmitting a control message to the terminal device conveying an indication of allocated transmission resources on the downlink data channel, determining a validity period for the control message, and transmitting a plurality of other messages to the terminal device on the downlink data channel using the allocated transmission resources within the validity period for the control message.

Paragraph 17. A base station for communicating with a terminal device in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the base station comprises a controller unit and a transceiver unit configured to operate together to transmit a control message to the terminal device conveying an indication of allocated transmission resources on the downlink data channel, to determine a validity period for the control message, and to transmit a plurality of other messages to the terminal device on the downlink data channel using the allocated transmission resources within the validity period for the control message.

Paragraph 18. Circuitry for a base station communicating with a terminal device in a telecommunications system over a radio interface supporting a downlink control channel for conveying control messages from the base station to the terminal device and a downlink data channel for conveying other messages from the base station to the terminal device, wherein the control messages convey information on resource allocations for the other messages on the downlink data channel, and wherein the circuitry comprises a controller element and a transceiver element configured to operate together to cause the base station to transmit a control message to the terminal device conveying an indication of allocated transmission resources on the downlink data channel, to determine a validity period for the control message, and to transmit a plurality of other messages to the terminal device on the downlink data channel using the allocated transmission resources within the validity period for the control message.

Group 2 of numbered paragraphs:

Paragraph 1. A method of operating a base station for communicating a message to one or more terminal devices in a wireless telecommunications system over a radio interface having a radio frame structure comprising a plurality of subframes, wherein the message may be transmitted in accordance with a first transmission scheme using transmission resources in a first number of radio subframes or transmitted in accordance with a second transmission scheme using transmission resources in a second number of radio subframes, wherein the second number is greater than the first number, wherein the message is associated with an identifier to indicate a terminal device to which the message is addressed, and wherein the method comprises selecting a characteristic for the identifier in dependence on whether the message is to be transmitted in accordance with the first transmission scheme or the second transmission scheme.

Paragraph 2. The method of any preceding paragraph, wherein the first number of radio subframes comprises a single radio subframe and the second number of radio subframes comprises a plurality of radio subframes.

Paragraph 3. The method of any preceding paragraph, wherein terminal devices in the wireless telecommunications system comprise a first set of terminal devices and a second set of terminal devices, and wherein the method comprises determining whether to transmit the message in accordance with the first transmission scheme or the second transmission scheme in dependence on whether a terminal device to which the message is to be transmitted is a member of the first set of terminal devices or the second set of terminal devices.

Paragraph 4. The method of any preceding paragraph, wherein the method comprises determining whether to transmit the message in accordance with the first transmission scheme or the second transmission scheme in dependence on a radio propagation parameter associated with radio communications between the base station and a terminal device to which the message is to be transmitted.

Paragraph 5. The method of paragraph 4, wherein the radio propagation parameter is selected from the group comprising: a path loss; an error rate; a positive acknowledgment, ACK, signalling rate; and a negative acknowledgment signalling, NACK, rate.

Paragraph 6. The method of any preceding paragraph, wherein the method comprises determining whether to transmit the message in accordance with the first transmission scheme or the second transmission scheme in dependence on an identity and/or type of a terminal device to which the message is to be transmitted.

Paragraph 7. The method of any preceding paragraph, wherein the radio interface supports a downlink control channel for conveying control messages from the base station to terminal devices and a downlink data channel for conveying other messages from the base station to terminal devices, wherein the control messages convey information on resource allocations for the other messages on the downlink data channel, and wherein the message comprises a control message transmitted on the downlink control channel.

Paragraph 8. The method of any preceding paragraph, wherein the radio interface supports a downlink control channel for conveying control messages from the base station to terminal devices and a downlink data channel for conveying other messages from the base station to terminal devices, wherein the control messages convey information on resource allocations for the other messages on the downlink data channel, and wherein the message comprises one of the other messages transmitted on the downlink data channel.

Paragraph 9. The method of any preceding paragraph, wherein the identifier to indicate a terminal device to which the message is addressed is transmitted separately from the message.

1 Paragraph 0. The method of any preceding paragraph, wherein the identifier comprises a radio network temporary identifier, RNTI.

Paragraph 11. The method of any preceding paragraph, wherein the identifier is a common to a plurality of terminal devices.

Paragraph 12. The method of any preceding paragraph, wherein the message comprises a broadcast message.

Paragraph 13. The method of any preceding paragraph, wherein the message comprises a multicast message.

Paragraph 14. The method of any preceding paragraph, wherein for a given type of message the characteristic for the identifier is selected from a first predefined characteristic for the identifier associated with the given type of message and a second predefined characteristic for the identifier associated with the given type of message according to whether the message is to be transmitted in accordance with the first transmission scheme or the second transmission scheme.

Paragraph 15. The method of any preceding paragraph, wherein the message is selected from the group comprising: (i) a message associated with transmitting system information; (ii) a message associated with transmitting a paging message; (iii) a message associated with transmitting a random access response message; (iv) a message associated with transmitting power control information for an uplink control channel; (v) a message associated with transmitting power control information for an uplink data channel; and (vi) a message associated with a broadcast and/or multicast service.

Paragraph 16. The method of any preceding paragraph, wherein for a message to be transmitted in accordance with the second transmission scheme, a component of the message transmitted in one of the second number of subframes is associated with a characteristic for the identifier corresponding to that which would be used if the message were to be transmitted in accordance with the first transmission scheme.

Paragraph 17. The method of any preceding paragraph, wherein the characteristic for the identifier comprises a value for the identifier.

Paragraph 18. The method of any preceding paragraph, wherein the characteristic for the identifier comprises a search space in which a terminal device searches using the identifier to determine if a message has been addressed to the terminal device.

Paragraph 19. The method of any preceding paragraph, wherein the method comprises selecting the characteristic for the identifier from a plurality of different characteristics associated with different types of message.

Paragraph 20. The method of any preceding paragraph, wherein the characteristic for the identifier to be selected for a message to be transmitted in accordance with the second transmission scheme is defined in accordance with an operating standard for the wireless telecommunications system.

Paragraph 21. The method of any preceding paragraph, further comprising the base station pre-defining the characteristic for the identifier to be selected for a message to be transmitted in accordance with the second transmission scheme.

Paragraph 22. The method of paragraph 21, wherein the pre-defining the characteristic for the identifier is a value for the identifier selected from among a plurality of values.

Paragraph 23. A base station for communicating a message to one or more terminal devices in a wireless telecommunications system over a radio interface having a radio frame structure comprising a plurality of subframes, wherein the base station comprises a controller unit and a transceiver unit configured to operate together such that the message may be transmitted in accordance with a first transmission scheme using transmission resources in a first number of radio subframes or transmitted in accordance with a second transmission scheme using transmission resources in a second number of radio subframes, wherein the second number is greater than the first number, wherein the message is associated with an identifier to indicate a terminal device to which the message is addressed, and wherein a characteristic for the identifier is selected in dependence on whether the message is to be transmitted in accordance with the first transmission scheme or the second transmission scheme.

Paragraph 24. Circuitry for a base station communicating a message to one or more terminal devices in a wireless telecommunications system over a radio interface having a radio frame structure comprising a plurality of subframes, wherein the circuitry comprises a controller element and a transceiver element configured to operate together such that the message may be transmitted in accordance with a first transmission scheme using transmission resources in a first number of radio subframes or transmitted in accordance with a second transmission scheme using transmission resources in a second number of radio subframes, wherein the second number is greater than the first number, wherein the message is associated with an identifier to indicate a terminal device to which the message is addressed, and wherein a characteristic for the identifier is selected in dependence on whether the message is to be transmitted in accordance with the first transmission scheme or the second transmission scheme.

Paragraph 25. A method of operating a terminal device for receiving a message from a base station in a wireless telecommunications system over a radio interface having a radio frame structure comprising a plurality of subframes, wherein the message may be transmitted by the base station in accordance with a first transmission scheme using transmission resources in a first number of radio subframes or transmitted by the base station in accordance with a second transmission scheme using transmission resources in a second number of radio subframes, wherein the second number is greater than the first number, and wherein the method comprises determining from an identifier associated with the message that the message is addressed to the terminal device, and further determining from a characteristic of the identifier whether the message transmission is in accordance with the first transmission scheme or the second transmission scheme.

Paragraph 26. A terminal device for receiving a message from a base station in a wireless telecommunications system over a radio interface having a radio frame structure comprising a plurality of subframes, wherein the message may be transmitted by the base station in accordance with a first transmission scheme using transmission resources in a first number of radio subframes or transmitted by the base station in accordance with a second transmission scheme using transmission resources in a second number of radio subframes, wherein the second number is greater than the first number, and wherein the terminal device comprises a controller unit and a transceiver unit configured to operate together to determine from an identifier associated with the message that the message is addressed to the terminal device, and to further determine from a characteristic of the identifier whether the message transmission is in accordance with the first transmission scheme or the second transmission scheme.

Paragraph 27. Circuitry for a terminal device for receiving a message from a base station in a wireless telecommunications system over a radio interface having a radio frame structure comprising a plurality of subframes, wherein the message may be transmitted by the base station in accordance with a first transmission scheme using transmission resources in a first number of radio subframes or transmitted by the base station in accordance with a second transmission scheme using transmission resources in a second number of radio subframes, wherein the second number is greater than the first number, and wherein the circuitry comprises a controller element and a transceiver element configured to operate together to determine from an identifier associated with the message that the message is addressed to the terminal device, and to further determine from a characteristic of the identifier whether the message transmission is in accordance with the first transmission scheme or the second transmission scheme.

REFERENCES

[1] ETSI TS 122 368 V10.530 (2011 July)/3GPP TS 22.368 version 10.5.0 (Release 10)
[2] Holma H. and Toskala A, "LTE for UMTS OFDMA and SC-FDMA based radio access", John Wiley and Sons, 2009
[3] ETSI TS 136 331 V11.4.0 (2013 July)/3GPP TS 36.331 version 11.4.0 Release 11)
[4] 3GPP document R1-135422, "On the need of PDCCH for SIB and other Common Channel", Mediatek, RAN1#75, San Francisco, November 2013
[5] 3GPP document R1-134207, "Coverage enhancement techniques for PBCH", Alcatel-Lucent, Alcatel-Lucent Shanghai Bell, RAN1#74bis, Guangzhou, October 2013.

What is claimed is:

1. A method of operating a terminal device communicating with a telecommunications network over a radio interface provided by the telecommunications network supporting a downlink control channel for conveying control messages to the terminal device and a downlink data channel for conveying other messages to the terminal device, wherein the control messages convey information on resource allocations for the other messages on the downlink data channel, and wherein the method comprises:
   receiving a control message from the telecommunications network conveying an indication of allocated transmission resources on the downlink data channel;
   determining a validity period for the control message; and
   receiving a plurality of other messages from the telecommunications network on the downlink data channel using the allocated transmission resources within the validity period for the control message, wherein
   the radio interface is based on a radio frame structure comprising a plurality of subframes, and the timing of a subframe used to convey a first one of the plurality of other messages is used to determine the timing of a subframe used to convey a second one of the plurality of other messages within the validity period for the control message.

2. The method of claim 1, wherein the other messages comprise system information messages.

3. The method of claim 1, wherein the system information messages comprise one or more system information blocks.

4. The method of claim 1, wherein the validity period for the control message is determined in dependence on an identifier used in association with the control message.

5. The method of claim 4, wherein the identifier comprises an indication of one or more terminal devices to which the control message is addressed.

6. The method of claim 1, wherein the validity period for the control message is determined in dependence on a transmission characteristic of the control message.

7. The method of claim 6, wherein the transmission characteristic of the control message comprises a transmission time associated with the control message.

8. The method of claim 1, wherein the timing of the subframe used to convey the first one of the plurality of other messages relative to a first predefined range of subframes is used to determine the timing of the subframe used to convey the second one of the plurality of other messages relative to a second predefined range of subframes.

9. The method of claim 1, wherein the validity period is determined in dependence on a validity period indicator received in association with the control message.

10. The method of claim 1, wherein the validity period is determined in dependence on the time at which a subsequent control message is received.

11. The method of claim 1, wherein the other messages comprise random access response messages and/or paging messages.

12. Circuitry for a terminal device communicating with a telecommunications network over a radio interface provided by the telecommunications network supporting a downlink control channel for conveying control messages to the terminal device and a downlink data channel for conveying other messages to the terminal device, wherein the control messages convey information on resource allocations for the other messages on the downlink data channel, and wherein the circuitry comprises:
   a controller element and a transceiver element configured to
      operate together to cause the terminal device to receive a control message from the telecommunications network conveying an indication of allocated transmission resources on the downlink data channel;
      determine a validity period for the control message; and
      receive a plurality of other messages from the telecommunications network on the downlink data channel using the allocated transmission resources within the validity period for the control message, wherein
   the radio interface is based on a radio frame structure comprising a plurality of subframes, and the timing of a subframe used to convey a first one of the plurality of other messages is used to determine the timing of a subframe used to convey a second one of the plurality of other messages within the validity period for the control message.

13. A terminal device for communicating with a telecommunications network that provides a downlink control channel for conveying control messages to the terminal device and a downlink data channel for conveying other messages to the terminal device, wherein the control messages convey information on resource allocations for the other messages on the downlink data channel, and wherein the terminal device comprises:
   a controller and a transceiver unit configured to
      operate together to receive a control message from the telecommunications network conveying an indication of allocated transmission resources on the downlink data channel;
      determine a validity period for the control message; and
      receive a plurality of other messages from the telecommunications network on the downlink data channel using the allocated transmission resources within the validity period for the control message, wherein
   the radio interface is based on a radio frame structure comprising a plurality of subframes, and the timing of a subframe used to convey a first one of the plurality of other messages is used to determine the timing of a subframe used to convey a second one of the plurality of other messages within the validity period for the control message.

* * * * *